US010972492B2

(12) United States Patent
Ogawa

(10) Patent No.: US 10,972,492 B2
(45) Date of Patent: *Apr. 6, 2021

(54) SYSTEMS, METHODS, AND COMPUTER-READABLE MEDIA FOR DATA SECURITY

(71) Applicant: Nasdaq, Inc., New York, NY (US)

(72) Inventor: Stuart Ogawa, Los Gatos, CA (US)

(73) Assignee: Nasdaq, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/597,012

(22) Filed: Oct. 9, 2019

(65) Prior Publication Data
US 2020/0045072 A1 Feb. 6, 2020

Related U.S. Application Data

(63) Continuation of application No. 15/582,786, filed on May 1, 2017, now Pat. No. 10,484,409, which is a (Continued)

(51) Int. Cl.
*H04L 29/06* (2006.01)
*G06F 16/13* (2019.01)
(Continued)

(52) U.S. Cl.
CPC .......... *H04L 63/1425* (2013.01); *G06F 16/13* (2019.01); *G06F 16/951* (2019.01);
(Continued)

(58) Field of Classification Search
CPC ............. H04L 63/1425; H04L 63/1441; H04L 63/1416; G06F 16/13; G06F 16/951; G06F 21/554

See application file for complete search history.

(56) References Cited

U.S. PATENT DOCUMENTS 7,237,264 B1 * 6/2007 Graham .............. H04L 63/1416 726/23
7,243,230 B2 * 7/2007 England .................. G06F 21/57 380/201

(Continued)

OTHER PUBLICATIONS

U.S. Appl. No. 15/582,786, filed May 1, 2017, Inventor: Ogawa.

(Continued)

*Primary Examiner* — J. Brant Murphy
(74) *Attorney, Agent, or Firm* — Nixon & Vanderhye P.C.

(57) ABSTRACT

Systems and methods are provided for data security. A server system provides data security using one or more processor devices, one or more communication interfaces, and one or more memory devices including computer-executable instructions. Those instructions case the one or more processor devices to: monitor one or more requests or activities of a computing device and compare the monitored one or more requests or activities with a database of predetermined characteristics to determine whether the monitored one or more requests or activities indicates that the computing device (i) accessed or attempted to access sequentially more than A data files or objects in less than a predetermined period of time, where A is a positive integer greater than two, and (ii) downloaded X data files or objects, where X is a positive integer greater than two. The monitored one or more requests or activities is determined suspicious when the comparing determines that (i) and (ii) are true, which causes a response to hinder the monitored one or more requests or activities.

19 Claims, 25 Drawing Sheets

Related U.S. Application Data continuation of application No. 14/609,074, filed on Jan. 29, 2015, now Pat. No. 9,652,464.

(60) Provisional application No. 61/933,434, filed on Jan. 30, 2014.

(51) Int. Cl.
 *G06F 16/951* (2019.01)
 *G06F 21/55* (2013.01)

(52) U.S. Cl.
 CPC ........ *G06F 21/554* (2013.01); *H04L 63/1416* (2013.01); *H04L 63/1441* (2013.01)

(56) References Cited

U.S. PATENT DOCUMENTS

| | | | |
|---|---|---|---|
| 8,286,255 | B2 | 10/2012 | Grant et al. |
| 8,402,278 | B2* | 3/2013 | Gassoway ........... G06F 21/6209 713/189 |
| 8,490,190 | B1* | 7/2013 | Hernacki ........... H04L 63/1425 726/23 |
| 8,516,584 | B2 | 8/2013 | Moskovitch et al. |
| 9,396,287 | B1* | 7/2016 | Bhave ................ G06F 16/185 |
| 9,516,053 | B1* | 12/2016 | Muddu ............... G06F 16/254 |
| 9,652,464 | B2 | 5/2017 | Ogawa |
| 2001/0025311 | A1* | 9/2001 | Arai .................... H04L 63/101 709/225 |
| 2002/0032774 | A1* | 3/2002 | Kohler, Jr. .......... H04L 63/1458 709/225 |
| 2002/0143963 | A1* | 10/2002 | Converse ........... H04L 63/1416 709/229 |
| 2003/0105976 | A1* | 6/2003 | Copeland, III ......... H04L 29/06 726/4 |
| 2004/0003286 | A1* | 1/2004 | Kaler .................. G06F 21/554 726/25 |
| 2004/0093513 | A1* | 5/2004 | Cantrell ............. H04L 63/0442 726/23 |
| 2005/0028013 | A1* | 2/2005 | Cantrell ............. H04L 63/1416 726/4 |
| 2005/0044422 | A1* | 2/2005 | Cantrell ............. H04L 63/0442 726/4 |
| 2005/0216955 | A1* | 9/2005 | Wilkins ............. H04L 63/1408 726/23 |
| 2006/0070130 | A1* | 3/2006 | Costea ................ G06F 21/552 726/24 |
| 2006/0085855 | A1* | 4/2006 | Shin ................... H04L 63/1416 726/23 |
| 2007/0097976 | A1* | 5/2007 | Wood ................. H04L 63/1416 370/392 |
| 2007/0180526 | A1* | 8/2007 | Copeland, III ..... H04L 63/1416 726/23 |
| 2008/0107271 | A1* | 5/2008 | Mergen ................ H04L 63/068 380/278 |
| 2008/0184371 | A1* | 7/2008 | Moskovitch .......... G06F 21/566 726/24 |
| 2008/0313026 | A1* | 12/2008 | Rose ...................... G06Q 30/02 705/12 |
| 2010/0037324 | A1* | 2/2010 | Grant .................... G06F 21/554 726/27 |
| 2011/0208714 | A1* | 8/2011 | Soukal ................ G06F 16/951 707/709 |
| 2011/0239306 | A1* | 9/2011 | Avni .................... G06F 21/554 726/26 |
| 2011/0251951 | A1* | 10/2011 | Kolkowitz ............ G06Q 20/40 705/39 |
| 2012/0096553 | A1* | 4/2012 | Srivastava ............ H04L 51/12 726/24 |
| 2012/0110174 | A1* | 5/2012 | Wootton ................ H04W 4/00 709/224 |
| 2012/0213082 | A1* | 8/2012 | Carney ................ H04M 3/436 370/241 |
| 2012/0271809 | A1* | 10/2012 | Lyon .................... G06F 16/951 707/706 |
| 2013/0091573 | A1* | 4/2013 | Herz .................... H04L 63/1441 726/23 |
| 2013/0111540 | A1* | 5/2013 | Sabin .................. G06F 21/554 726/1 |
| 2014/0270411 | A1* | 9/2014 | Shu ..................... G06K 9/6211 382/118 |
| 2015/0341376 | A1* | 11/2015 | Nandy ................ H04L 63/1408 726/23 |

OTHER PUBLICATIONS

Office Action dated Jan. 10, 2019 U.S. Appl. No. 15/582,786 13 pages.

International Search Report issued in corresponding PCT Application No. PCT/CA2015/050063, search completed Apr. 7, 2015, 2 pages.

\* cited by examiner

SYSTEMS, METHODS, AND COMPUTER-READABLE MEDIA FOR DATA SECURITY

CROSS-REFERENCE TO RELATED APPLICATIONS

This application is a continuation of U.S. patent application Ser. No. 15/582,786, filed May 1, 2017, which is a continuation of U.S. patent application Ser. No. 14/609,074, filed Jan. 29, 2015, which claims priority to U.S. Provisional Patent Application No. 61/933,434, filed on Jan. 30, 2014, the entire contents of each of which are incorporated herein by reference.

TECHNICAL FIELD

The following generally relates to data security.

BACKGROUND

Data security continues to be of growing importance. Adversarial parties, also called hackers, attempt to access data networks and data against the wishes of the owners of the data networks and the data. Adversarial parties may wish to steal confidential information, personal information, business information, or other types of information. The stealing of information is a global and lucrative business resulting in an increase of digital crime.

Typically, to defend or prevent such data attacks, a firewall is put in place and the data is encrypted. Different types of firewalls may be used, such as a network layer or packet filter, an application-layer firewall, a proxy server firewall, and firewalls with network address translation functionality.

Adversarial parties are becoming more advanced in their attack methods and, in some cases, encryption and firewall defenses do not provide sufficient data security.

BRIEF DESCRIPTION OF THE DRAWINGS

Embodiments will now be described by way of example only with reference to the appended drawings wherein.

DETAILED DESCRIPTION OF THE DRAWINGS

Figure 1:
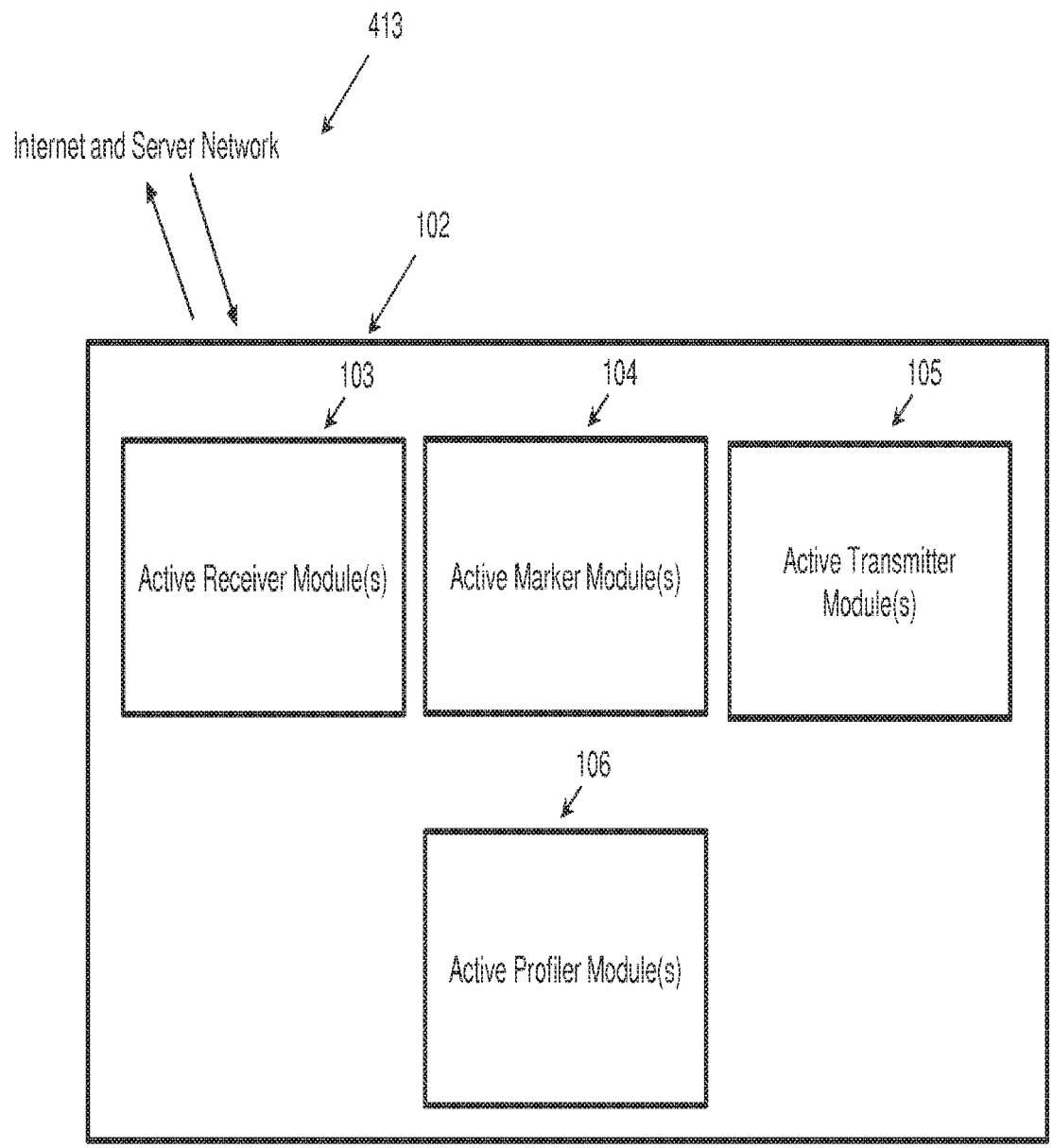
FIG. 1 is a block diagram of a continuous active data security system interacting with the Internet or a server network, or both.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

In many server network systems, data is stored on the servers for authorized users to access, view, edit, download, or more. The data is, in many cases, intended only for certain users to access and it is intended that other users are prohibited to access such data. Firewall and encryption security measures are typically put into place to allow the authorized users to access the data, but to prohibit other users for accessing the data.

It is recognized that an adversary, also called an attacker, hacker, security hacker, and computer criminal, may be able to overcome the firewall and encryption security measures to gain access to the data.

It is also recognized that if an adversary overcomes the firewall and encryption security measures, it may be difficult to quickly detect and stop the adversary from accessing more data.

It is recognized that an adversary may have obtained (e.g. stolen) legitimate user credentials and use the user credentials to access the server network. In this way, it may be difficult to detect that the adversary is acting under the guise of the legitimate user credentials.

It also recognized that detecting an adversary and their actions is difficult when there are many users accessing a server network and when there is a vast amount of data files and objects in the server network. It would be difficult to identify an adversary amongst hundreds or thousands of authorized users, or more, where the authorized users may regularly access the server network.

In the proposed systems and methods described herein, an adversary may have successfully breached the firewall, or may have breached the encryption measures. The proposed systems and methods help to detect such a successful adversary, to hinder the successful adversary from gaining further access and to hinder the successful adversary from downloading data.

The proposed systems and methods described herein address one or more of these above issues. The proposed systems and methods use one or more computing devices to receive requests and actions related to data, detect suspicious actions, apply markers to data files and objects, and transmit warnings and termination commands. In a preferred example embodiment, these systems and methods are automated and require no input from a person for continuous operation. In another example embodiment, some input from a person is used to customize operation of these systems and methods.

The proposed systems and methods are able to obtain feedback during this process to improve computations related to any of the operations described above. For example, feedback is obtained about typical actions and suspicious actions, and this feedback can be used to adjust parameters related to detecting future suspicious actions and the type of response actions to be implemented. This feedback may also used to adjust parameters that affect how data is stored. Further details and example embodiments regarding the proposed systems and methods are described below.

Turning to FIG. 1, the proposed system 102 includes an active receiver module 103, an active marker module 104, an active transmitter module 105, and an active profiler module 106. The system 102 is in communication with a server network 413, and may additionally be in communication with trusted external devices. In an example embodiment, these modules function together to monitor data requests and actions from the server network 413, detect suspicious users and activities, apply markers to data objects and files to improve security, transmit warnings and commands to respond to suspicious actions, and to profile data, users, IP addresses, and activity within the server network.

A server network refers to one or more computing devices, or servers, that store data files or data objects that are desired to be private from some users.

Data files or data objects refer to individual objects of data or collections of data, and these terms may be used interchangeably. Non-limiting examples of data files or objects include: documents, images, video, presentations, emails, posts, databases, logs of data, meta data, contact information, user credentials, financial data, location information, medical records, executable software, software applications, etc.

The active receiver module 103 captures data, for example in real-time, from the existing computing systems in the server network. The active receiver module is configured to analyze this data, for example in real-time, and to determine security risks based on the analysis.

The active marker module 104 analyzes data files and objects within the server network, for example in real-time, and applies markers to the data files and objects. The markers are used to classify the data. Classifications of the data may include high value, medium value, low value, business, personal, medical, confidential, military, financial, etc. The markers may also transmit a signal to the marker module 104 or receiver module 103, and may be able to destroy the data file or data object. In an example embodiment, the markers are metadata that are embedded within the data so that the marker cannot be detected by computing devices. In other words, to the adversary, it would not be known, at least initially, that the marker is embedded in a data file of data object.

The active transmitter module 105 executes real time actions based on the data and analysis of the active receiver module 103 and the active marker module 104. For example, the active transmitter module can send warning messages, end communication sessions with a computing device, terminate communication channels with a server, and power off a server. Other actions can be taken by the active transmitter module in response to suspicious activity.

The active profiler module 106 obtains data from each of the other modules 103, 104, 105 and analyses the data. The active profiler module 106 uses the analytic results to generate adjustments for one or more various operations related to any of the modules 103, 104, 105 and 106. The active profiler module gathers data over time to generate "profiles" or histories of adversaries, users, suspicious behavior, suspicious actions, past attacks, and responses to security risks. The active profiler module may also generate profiles or histories of data files or objects, such as the classification of a data file or object and associated users, IP addresses, and actions related to such a data file of object.

In an example embodiment, there are multiple instances of each module. For example, multiple active receiver modules 103 are located in different geographic locations. One active receiver module is located in North America, another active receiver module is located in South America, another active receiver module is located in Europe, and another active receiver module is located in Asia. Similarly, there may be multiple active marker modules, multiple active transmitter modules and multiple active profiler modules. These modules will be able to communicate with each other and send information between each other. The multiple modules allows for distributed and parallel processing of data.

Figure 2:
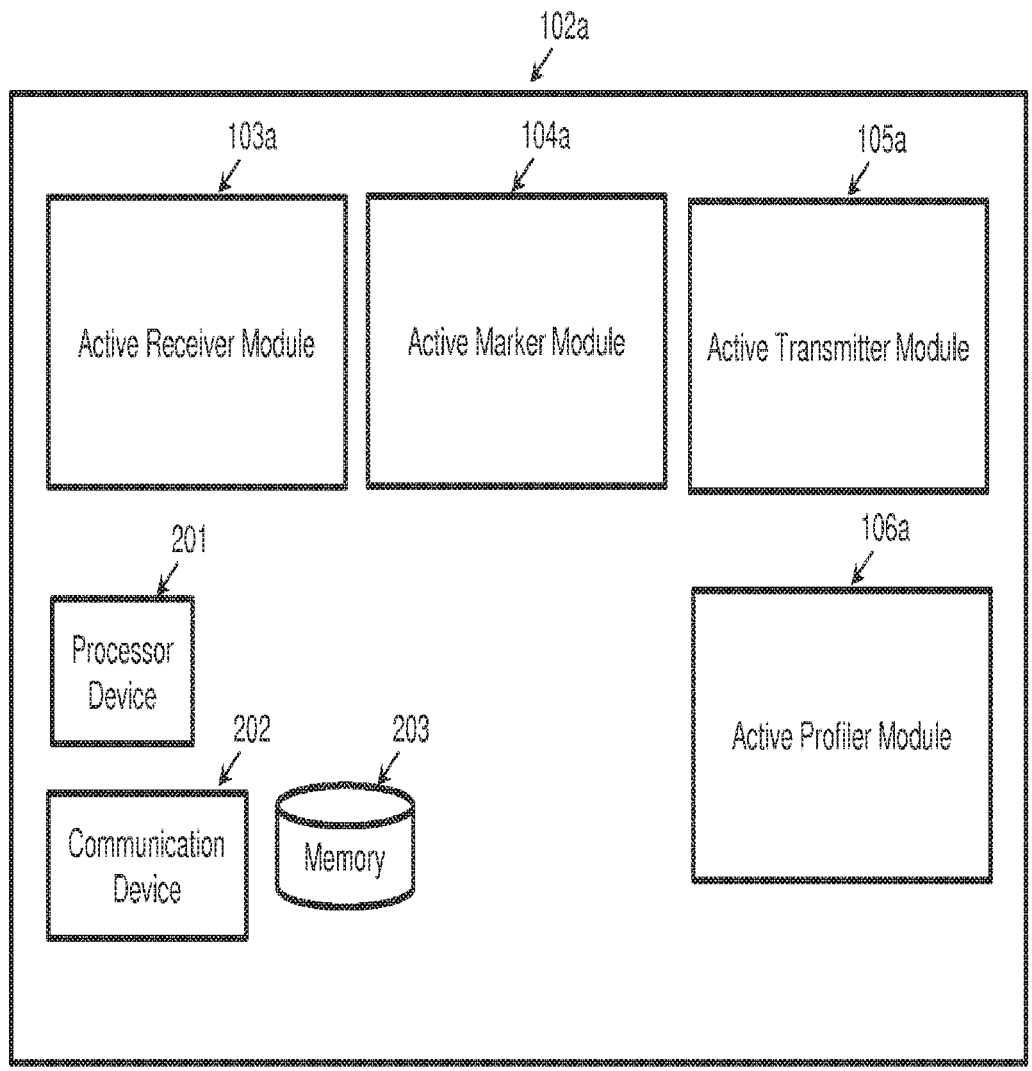
FIG. 2 is a block diagram of an example embodiment of a computing system for continuous active security, including example components of the computing system.

Turning to FIG. 2, an example embodiment of a system 102a is shown. For ease of understanding, the suffix "a" or "b", etc. is used to denote a different embodiment of a previously described element. The system 102a is a computing device or a server system and it includes a processor device 201, a communication device 202 and memory 203. The communication device is configured to communicate over wired or wireless networks, or both. The active receiver module 103a, the active marker module 104a, the active transmitter module 105a, and the active profiler module 106a are implemented by software and reside within the same computing device or server system 102a. In other words, the modules may share computing resources, such as for processing, communication and memory.

Figure 3:
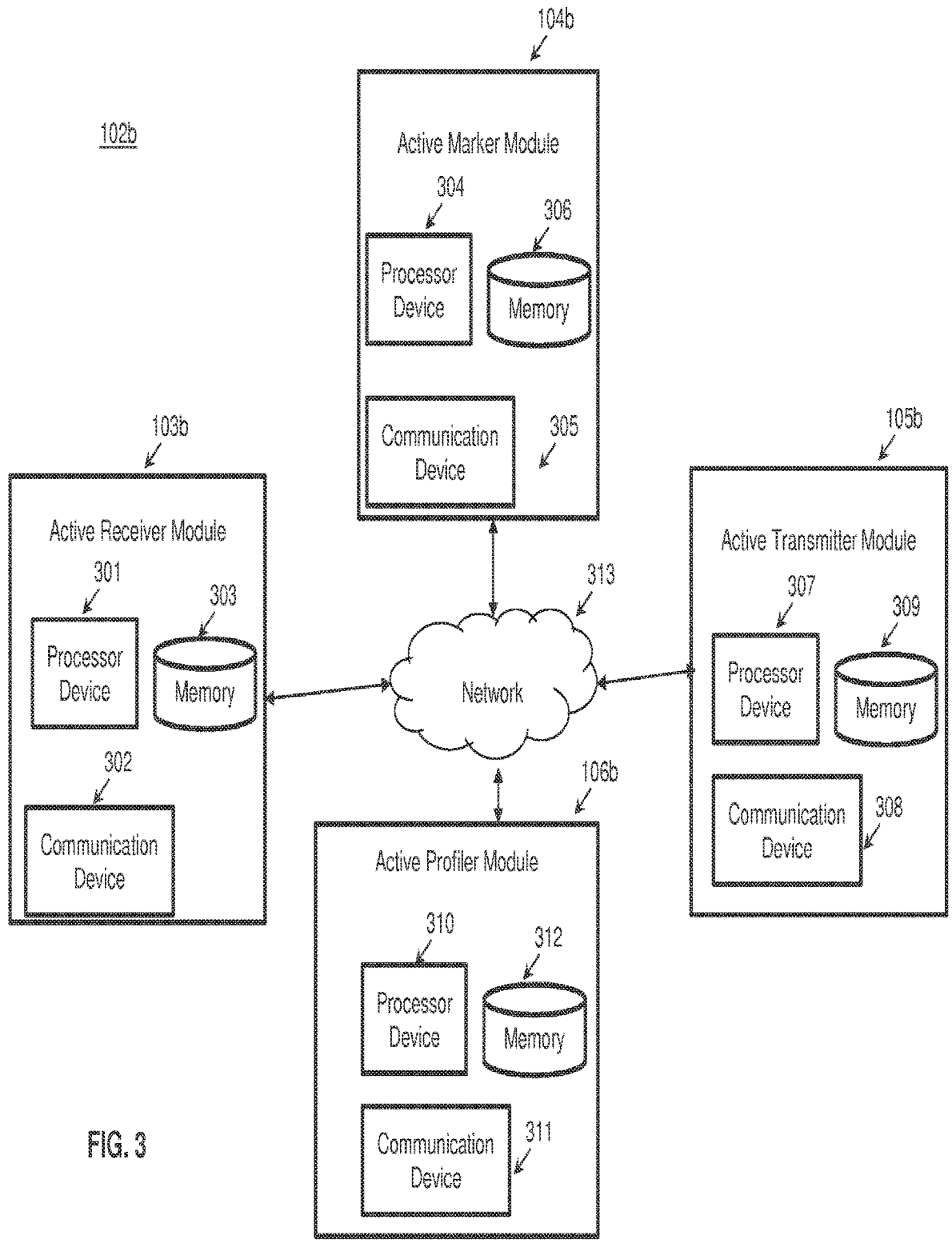
FIG. 3 is a block diagram of an example embodiment of multiple computing devices interacting with each other over a network to form the continuous active data security system.

Turning to FIG. 3, another example embodiment of a system 102b is shown. The system 102b includes different modules 103b, 104b, 105b, 106b that are separate computing devices or server systems configured to communicate with each other over a network 313. In particular, the active receiver module 103b includes a processor device 301, a communication device 302, and memory 303. The active marker module 104b includes a processor device 304, a communication device 305, and memory 306. The active transmitter module 105b includes a processor device 307, a communication device 308, and memory 309. The active profiler module 106b includes a processor device 310, a communication device 311, and memory 312.

Although only a single active receiver module 103b, a single active marker module 104b, a single active transmitter module 105b and a single active profiler module 106b are shown in FIG. 3, it can be appreciated that there may be multiple instances of each module that are able to communicate with each other using the network 313. As described above with respect to FIG. 1, there may be multiple instances of each module and these modules may be located in different geographic locations.

It can be appreciated that there may be other example embodiments for implementing the computing structure of the system 102.

It is appreciated that currently known and future known technologies for the processor device, the communication device and the memory can be used with the principles described herein. Currently known technologies for processors include multi-core processors. Currently known technologies for communication devices include both wired and wireless communication devices. Currently known technologies for memory include disk drives and solid state drives. Examples of the computing device or server systems include dedicated rack mounted servers, desktop computers, laptop computers, set top boxes, and integrated devices combining various features. A computing device or a server uses, for example, an operating system such as Windows Server, Mac OS, Unix, Linux, FreeBSD, Ubuntu, etc.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 102, or any or each of the modules 103, 104, 105, 106, or accessible or connectable thereto. Any application or module herein described may be implemented using computer readable/executable instructions that may be stored or otherwise held by such computer readable media.

Figure 4:
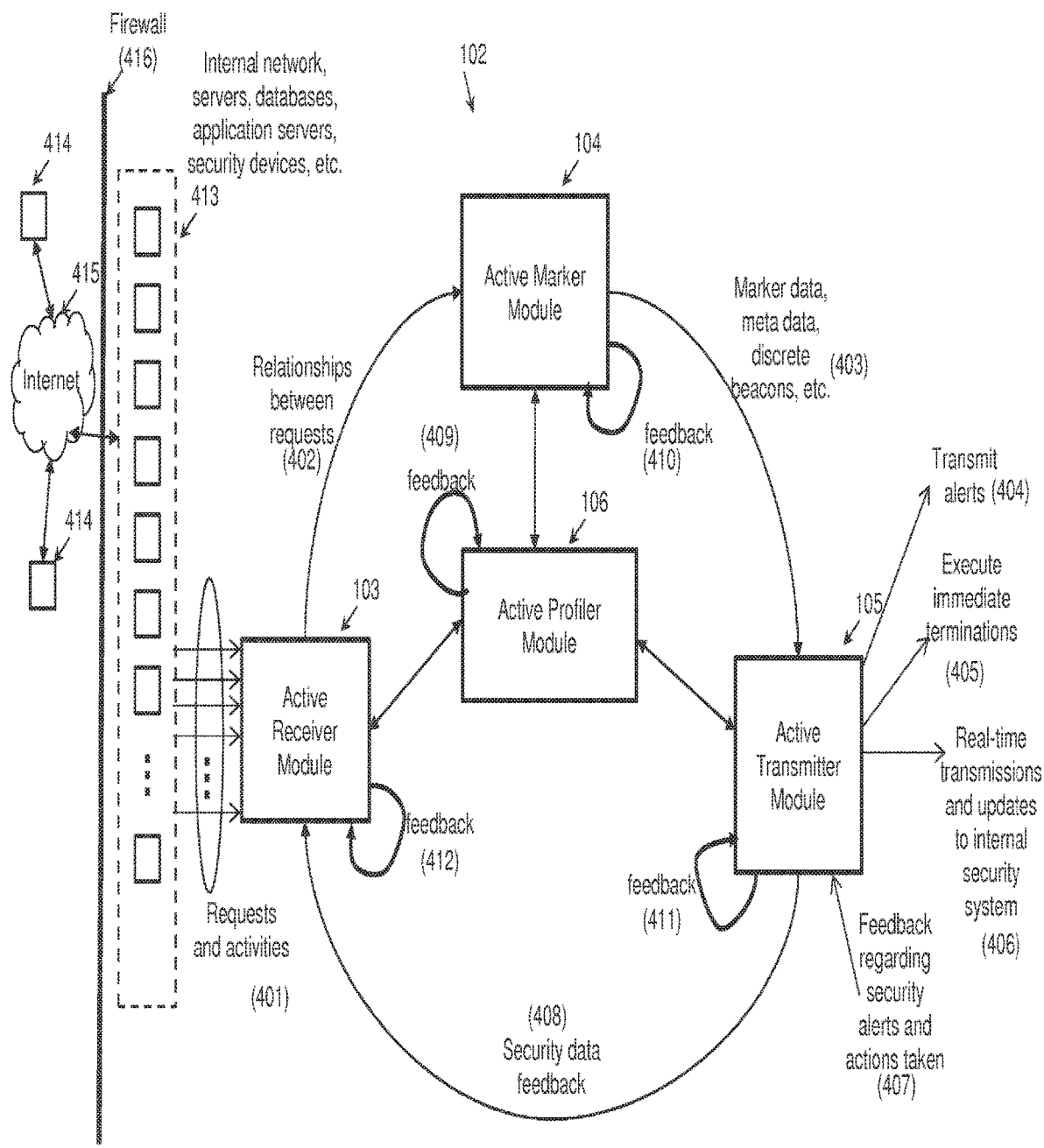
FIG. 4 is a schematic diagram showing the interaction and flow of data between an active receiver module, an active marker module, an active transmitter module and an active profiler module.

Turning to FIG. 4, the interactions between the modules are shown. The system 102 is configured to monitor requests, users, and actions of the server network 413 in real time.

In particular, the server network 413 includes servers, databases, application servers, security devices or other devices, or combinations of any of these devices or modules, which are in communication with each other. In general, a server network includes one or more servers or computing devices that are protected by a firewall 416 or some other security measure. In an example embodiment, the server network is a business network of a company intended for only company employees and company clients to access. Private data or data in general, is stored on the server network 413. In an example embodiment, the server network 413 is implemented via a cloud computing network.

As shown in FIG. 4, computing devices of clients or employees, or both, can access the server network 413, via the Internet 415, and through the firewall 416. In this way, authorized users can access, view, edit, download or upload data to the server network 413.

It is recognized that it is possible for adversaries to also access the server network 413. For example, an adversary has by-passed the firewall 416 or has passed through the firewall under a guise. The continuous active security system 102 monitors the actions and requests of all users and identifies suspicious patterns to detect an adversary roaming within the server network. The system 102 takes action to hinder or prevent the adversary from seeing further information or from downloading the data outside the server network 413.

The continuous active security system 102, and particularly the active receiver module 103, monitors the requests and activities 401 of the server network 413. For example, the requests include IP (internet protocol) requests, query requests, viewed data requests, content download requests, and meta data download requests. For example, if a user uses their computing device to access the server network to search for data, or to view data, or to download data, or any other activity, the requests and actions of the user are sent to the active receiver module 103 for analysis.

The active receiver module detects suspicious patterns, actions, and characteristics based on the monitored data 401. The active receiver module sends relationships between these requests 402 to the active marker module 104. The active marker module 104 applies markers to data files or data objects to improve the tracking and security of the data files or data objects. In an example embodiment, the active marker module also uses the relationships to establish classification of data (e.g. high value, middle value, low value, confidential, etc.). The classification data is used to help determine the types of response actions and the timing of when the response actions are implemented, in response to suspicious activity. For example, when suspicious activity is detected in relation to higher value data files or objects, the more immediate the response to prevent unwanted viewing of the higher value data.

The active marker module 104 sends the marker data, meta data, discrete beacons, etc. 403 to the active transmitter module 105. The active transmitter module detects suspicious activity in relation to the data markers, beacons, etc., the active transmitter module activates certain commands based on the data markers, beacons, etc. It is appreciated that each group of markers and beacons, or individual instances thereof, is associated can be associated with a unique set of response commands or actions. The active transmitter module also transmits alerts regarding a security risk 404, executes immediate terminations 405, and sends real-time transmissions and updates to the security system (e.g. the firewall 416, the security system 102, or another security system, or combinations thereof). The active transmitter also sends feedback regarding security alerts and actions taken 407.

The active transmitter module 105 sends security data as feedback 408 to the active receiver module 103. In an example embodiment, if the active transmitter module is activated due to unsecure, suspicious, or illegitimate use of data, then the active receiver module is updated or notified, or both. The active receiver module sends reports to security personnel identifying the suspicious actions or suspicious data. This information can be used to tighten security restrictions, such as which IP addresses or user accounts can access certain data. In another example embodiment, the active receiver module uses the data to automatically update its security parameters. For example, if the security data sent by the active transmitter module identifies suspicious actions, suspicious IP addresses, suspicious user accounts, etc., the active receiver module will active look for and monitor future actions, IP addresses and user accounts that match those that are identified as suspicious.

Periodically, or continuously, the active profiler module 106 obtains data from the other modules 103, 104, 105. The active profiler module 106 analyses the data to determine what adjustments can be made to the operations performed by each module, including module 106. It can be appreciated that by obtaining data from each of modules 103, 104 and 105, the active profiler module has greater contextual information compared to each of the modules 103, 104, 105 individually. For example, the active profiler module can send adjustments to the active receiver module better identify patterns and characteristics that are considered suspicious. The active profiler module 106 can send adjustments to the active marker module to improve how the markers are embedded into a data file or data object, or sends adjustments that change how data files and objects are classified. In another example, the active profiler module can send adjustments to the active transmitter module to change the types of response for a given suspicious action. Other types of adjustments can be made by the active profiler module.

Continuing with FIG. 4, each module is also configured to learn from its own gathered data and to improve its own processes and decision making algorithms. Currently known and future known machine learning and machine intelligence computations can be used. For example, the active receiver module 103 has a feedback loop 412; the active marker module 104 has a feedback loop 410; the active transmitter module 105 has a feedback loop 411; and the active profiler module 106 has a feedback loop 409. In this way, the process in each module can continuously improve individually, and also improve using the adjustments sent by the active profiler module 106. This self-learning on a module-basis and system-wide basis allows the system 102 to be, in an example embodiment, completely automated without human intervention.

It can be appreciated that as more data is provided and as more iterations are performed by the system 102, then the system 102 becomes more effective and efficient.

Other example aspects of the system 102 are described below.

The system 102 is configured to capture data in real time.

The system 102 is configured to analyze data relevant to a business or, a particular person or party, or a particular IP address, or a particular data file or object, in real time.

The system 102 is configured to apply metric analytics to determine the effectiveness of the risk detection and the responses to the risks.

The system 102 is configured to add N number of systems or modules, for example, using a master-slave arrangement.

It will be appreciated that the system 102 may perform other operations.

Figure 5:
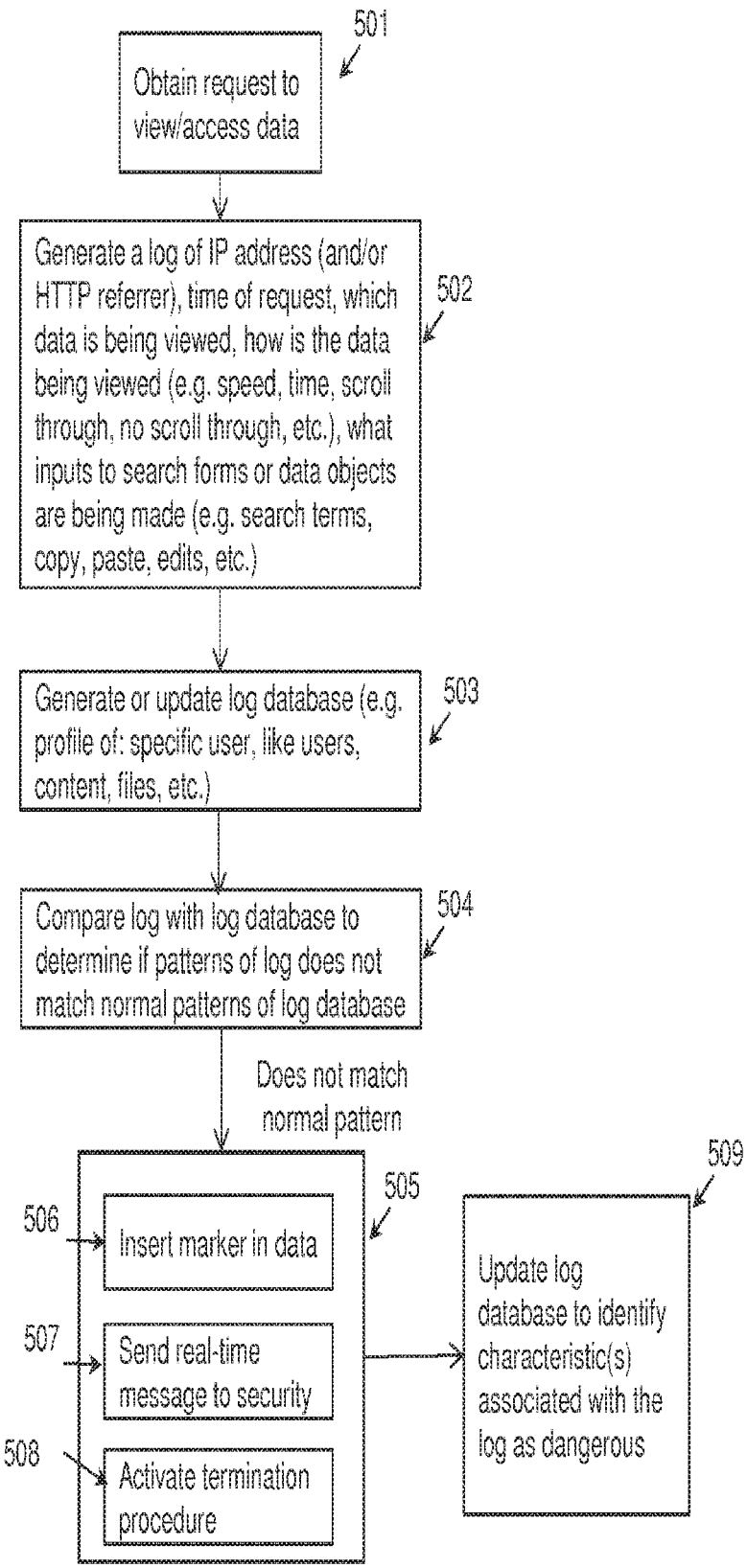
FIG. 5 is a flow diagram of an example embodiment of computer executable or processor implemented instructions for actively detecting security risks and responding to the same.

An example embodiment of computer or processor implemented instructions is shown in FIG. 5 for continuous active data security. The instructions are implemented by the system 102. At block 501, the system 102 obtains or receives one or more requests to view or access data. At block 502, the system generates a log of characteristics associated with the data request. Examples of the characteristics in the log include: the IP address (and/or HTTP referrer) associated with the external device making the request; the time or date, or both, of the request; which data is being viewed; how is the data being viewed (e.g. speed, time, scroll through, no scroll through, etc.); and what inputs to search forms or data objects are being made (e.g. search terms, copy, paste, edits, content, etc.).

At block 503, the system generates or updates a log database (e.g. profile of: specific user, like users, content, files, etc.) based on the log of characteristics associated with the data request. This log database is used to establish a baseline or pattern of typical or normal characteristics, patterns and behaviors. The log database also helps to establish a profile, history, or trend of suspicious characteristics, patterns and behaviors. As more instances of log data is added to the log database, the more effective the comparisons against the log database will be.

At block 504, the system compares the instance of the log, which was generated in block 502, against the log database to determine if patterns of the log do not match normal patterns of the log database. The system may also determine if the instance of the log does match suspicious characteristics or patterns known to the log database.

If the characteristics or patterns of the instance of the log do not match a normal pattern, or do match a suspicious pattern, then the system takes action, as per block 505. Actions or responses may include inserting a marker in the data that is at risk (block 506). Another response is to send a real-time message to security parties (block 505). Another response is to activate termination procedures (block 508). Termination may include any one or more of terminating the affected data object or data file, terminating the communication session with a particular user, terminating all communications related to a certain server within the server network 413, and terminating power to one or more servers within the server network. Other responses may be used. One or more responses can be implemented if a suspicious activity or a characteristic is detected.

At block 509, the system updates the log database to identify the characteristics associated with instance of the log as dangerous. In this way, future actions that are similar or match the instance of the log can be detected as being dangerous (e.g. a security attack). In addition, the responses are also logged, so that the effectiveness of the response to stop the attack can be evaluated. In this way, if there is a similar attack, if the previous response was effective, a similar response will be used. Otherwise, if the previous response was not effective, the system will select a different response to the attack.

Active Receiver Module

The active receiver module 103 automatically and dynamically listens to N number of data streams and is connected the server network 413. The active receiver module is able to integrate with other modules, such as the active composer module 104, the active transmitter module 105, and the social analytic synthesizer module 106.

Figure 6:
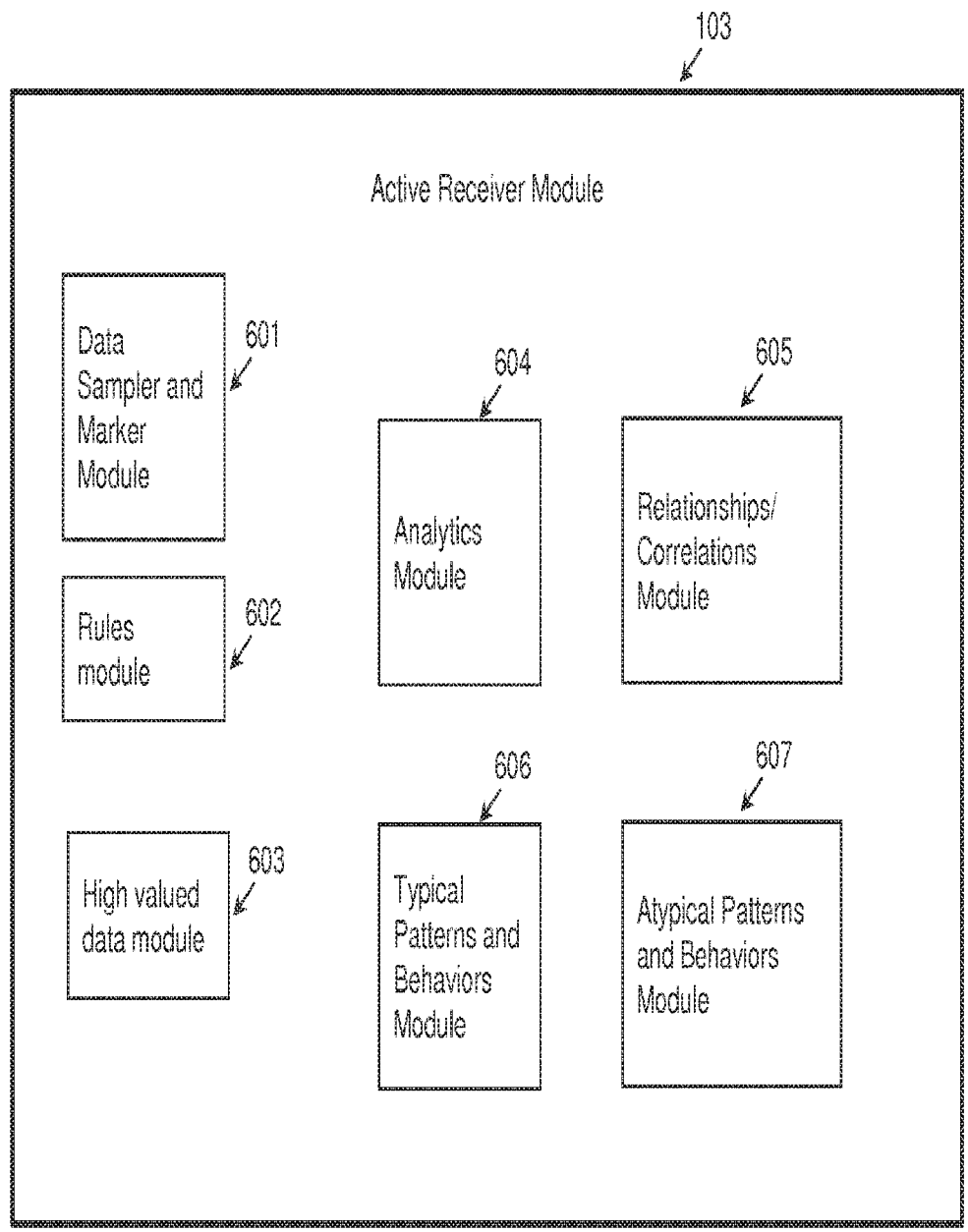
FIG. 6 is a block diagram of an active receiver module showing example components thereof

Turning to FIG. 6, example components of the active receiver module 103 are shown. The example components include a data sampler and marker module 601, a rules module 602, a high valued data module 603, an analytics module 604, a relationships/correlations module 605, a typical patterns and behaviors module 606 and an atypical patterns and behaviors module 607.

To facilitate real-time and efficient analysis of the obtained social data, different levels of speed and granularity are used to process the obtained social data. The module 601 is able to operate at different modes simultaneously. In the first mode, the module 601 is used first to initially sample and mark the obtained social data at a faster speed and lower sampling rate. This allows the active receiver module 103 to provide some results in real-time. In a second mode, the module 601 is also used to sample and mark the obtained data at a slower speed and at a higher sampling rate relative to module 601. This allows the active receiver module 103 to provide more detailed results derived from the first mode, although with some delay compared to the results derived from the first mode. A third mode of module samples all the data stored by the active receiver module at a relatively slower speed compared to the second mode, and with a much higher sampling rate compared to the second mode. This third mode allows the active receiver module 103 to provide even more detailed results compared to the results derived from the second mode. It can thus be appreciated, that the different levels of analysis can occur in parallel with each other and can provide initial results very quickly, provide intermediate results with some delay, and provide post-data-storage results with further delay. Other ways of obtaining the data, with or without sampling, can be used.

The sampler and marker module 601 is also configured to identify and extract other data including, for example: the time or date, or both, of the request, IP address, user accounts, credentials, cookies, digital signatures, geo-location, inputted data, viewed data, downloaded data, the content of the data, actions initiated by the suspicious user, and the time and date.

The rules module 602 stores and implements rules associated with suspicious or dangerous activity.

The high-valued data module 603 stores an index of high valued data and other data categorized under different classifications. These classifications are used to help detect suspicious activity.

The analytics module 604 can use a variety of approaches to analyze the data, including the requests and the actions. The analysis is performed to determine relationships, correlations, affinities, and inverse relationships. Non-limiting examples of algorithms that can be used include artificial neural networks, nearest neighbor, Bayesian statistics, decision trees, regression analysis, fuzzy logic, K-means algorithm, clustering, fuzzy clustering, the Monte Carlo method, learning automata, temporal difference learning, apriori algorithms, the ANOVA method, Bayesian networks, and hidden Markov models. More generally, currently known and future known analytical methods can be used to identify relationships, correlations, affinities, and inverse relationships amongst the social data. The analytics module 604, for example, obtains the data from the modules 601, 602, 603, 605, 606 and/or 607.

It will be appreciated that inverse relationships between two concepts, for example, is such that a liking or affinity to first concept is related to a dislike or repelling to a second concept.

The relationships/correlations module 605 uses the results from the analytics module to generate terms and values that characterize a relationship between at least two concepts. The concepts may include any combination of keywords, time, location, people, user accounts, query inputs, actions, IP address, geo-location, subject matter of data, etc.

The typical patterns and behaviors module 606 is a log database of characteristics, patterns and behaviours that are considered normal and acceptable. Data may be accrued over time to identify such typical and accepted patterns, behaviours, trends and characteristics. For example, it is normal or typical for an employee to log into their account during the hours 8:00 am to 8:00 pm in the Eastern Standard Time zone. It is also normal or typical for such an employee to run a query about files related to Company A and Company B.

The atypical patterns and behaviors module 607 includes a log database of characteristics, patterns and behaviors that are considered suspicious or dangerous. This log of data may be accrued over time by monitoring the requests and activities of the server network 413. The data can be used to identify suspicious characteristics, patterns and trends. These suspicious characteristics, patterns and behaviors may also be provided by an external source. For example, an external data source may send the system 102 a list of suspicious IP addresses, geo-locations, or actions.

Figure 7:
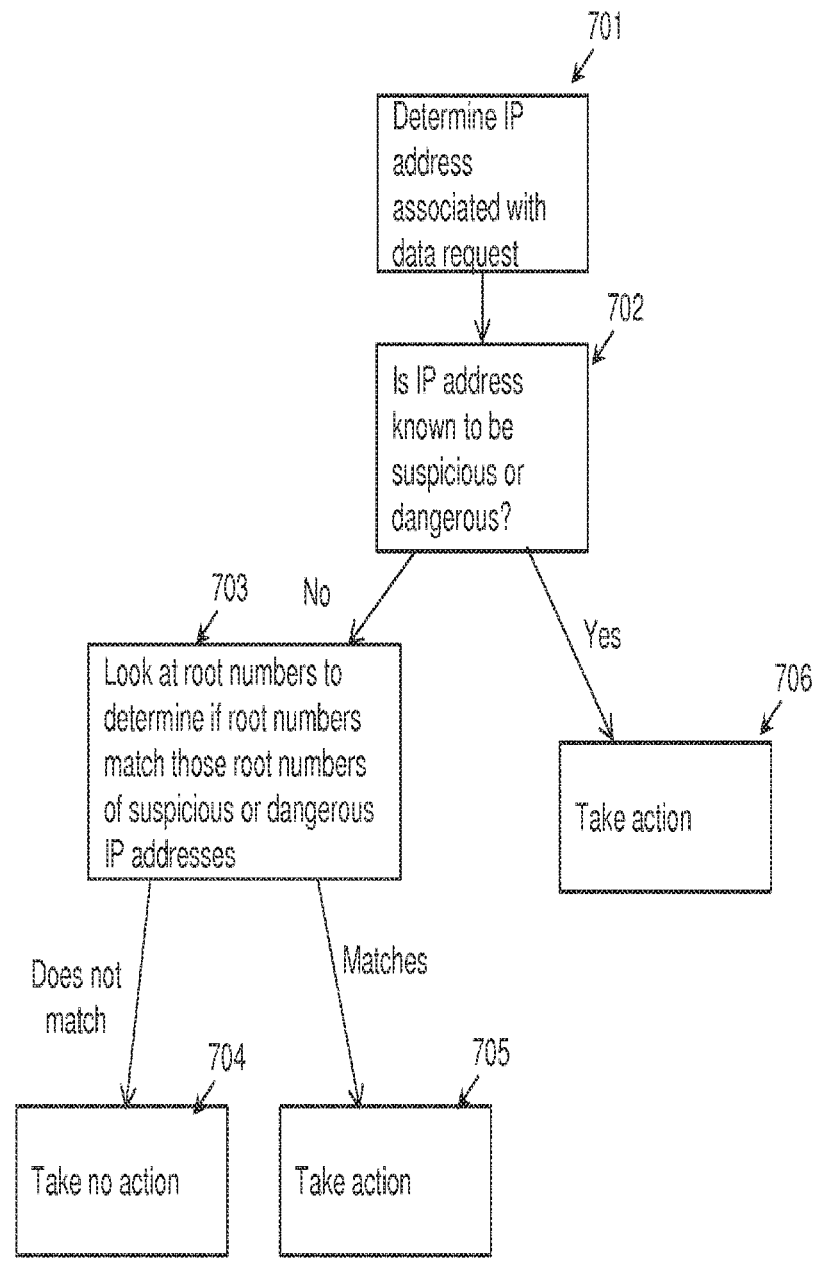
FIG. 7 is a flow diagram of an example embodiment of computer executable or processor implemented instructions for detecting a suspicious IP address.

Turning to FIG. 7, example computer or processor implemented instructions are provided for detecting suspicious activity, which may be performed by the active receiver module 103. At block 701, the module determines the IP (Internet Protocol) address associated with a data request. At block 702, the module determines if the IP address is known to be suspicious or dangerous. If so, action is taken (block 706). If the IP address is not known to be suspicious or dangerous, the module looks at root numbers of the IP address to determine if root numbers match those root numbers of suspicious or dangerous IP addresses (block 703). If the root numbers do not match, no action is taken (block 704). If the root numbers match, action is taken (block 705). In another example embodiment, if it is determined that the IP address is associated with a geo-location known to be suspicious or dangerous, action is also taken against the IP address.

Figure 8:
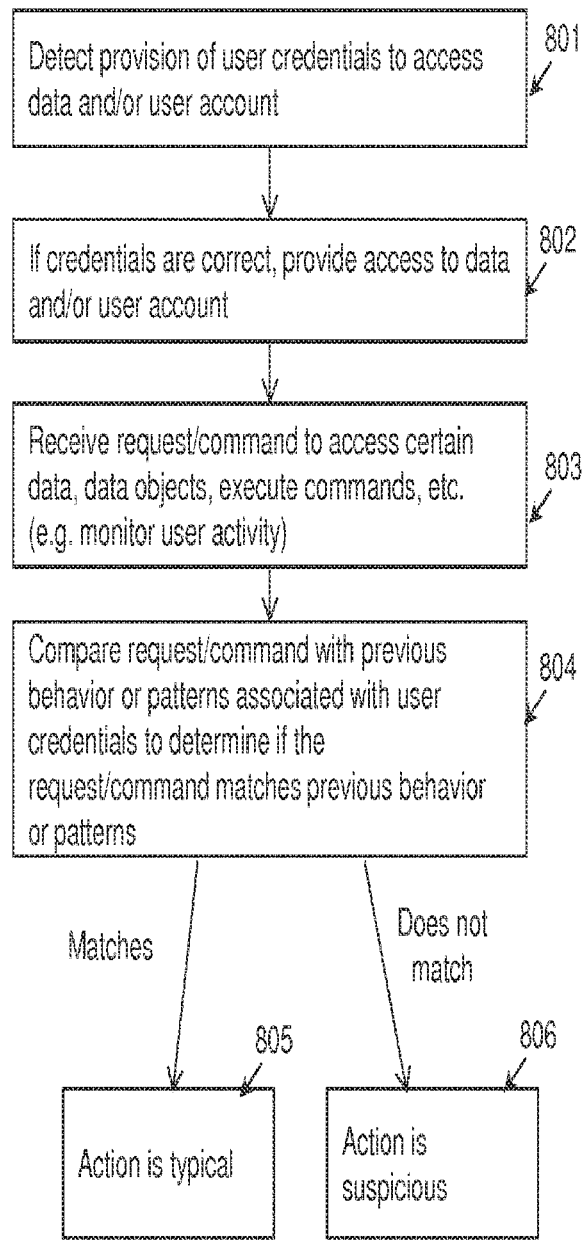
FIG. 8 is a flow diagram of an example embodiment of computer executable or processor implemented instructions for detecting suspicious requests and actions.

Turning to FIG. 8, example computer or processor implemented instructions are provided for detecting suspicious activity, which may be performed by the active receiver module 103. At block 801, the module detects provision of user credentials to access data or a user account, or both. The credentials may be a username and password, or some other credentials. If the credentials are correct, the module, or the overall server network 413, provides access to the data and/or the user account (block 802). At block 803, the module receives a request or command to access certain data, data objects, execute commands, etc. In other words, the module monitors activity (e.g. user activity, server activity, device activity, application activity, etc.). At block 804, the module compares the request or command with previous behavior or patterns associated with credentials (e.g. user credentials, server credentials, device credentials, application credentials, etc.) to determine if the request or command matches previous behavior or patterns. If there is a match, the action is considered typical (block 805). If the request or command does not match the previous behavior or patterns, the action is considered suspicious (block 806).

For example, if a user previously looked at data related to a certain topic (e.g. coffee) or a certain company (e.g. Coffee Company), and has not looked at other topics or companies in the past, but is now detected to access data related to a different topic (e.g. stocks) or a different company (e.g. Financial Company), then the user's action is considered suspicious.

Figure 9:
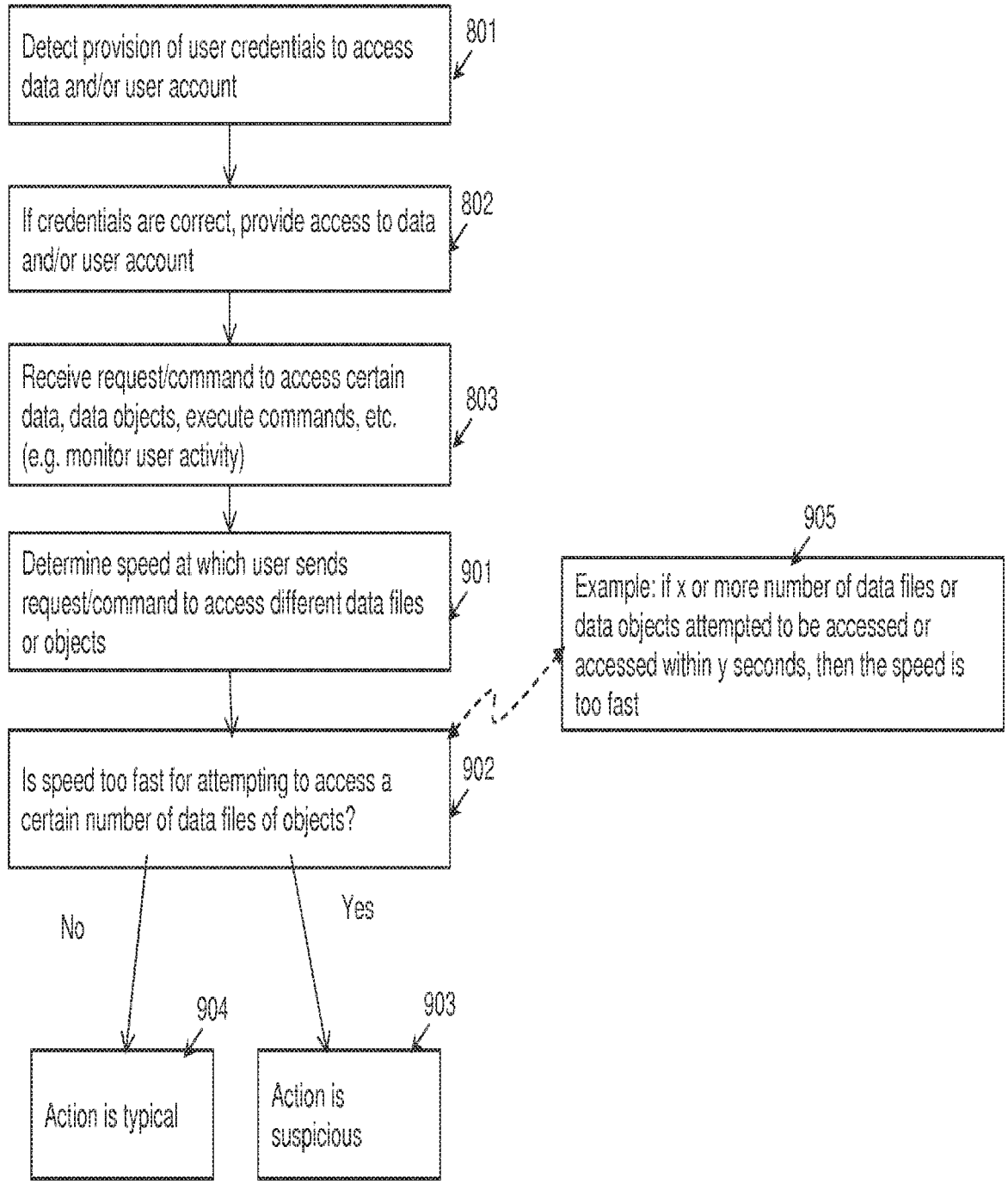
FIG. 9 is a flow diagram of an example embodiment of computer executable or processor implemented instructions for detecting suspicious actions based on the speed at which requests are being made by a user.

Turning to FIG. 9, similar example computer or processor implemented instructions are provided for detecting suspicious activity, as per FIG. 8. Blocks 801, 802, 803 are implemented. Following, at block 901, the module determines the speed at which the user sends or makes the request or command to access different data files or object. At block 902, the module determines if the speed is too fast for attempting to access, or actually accessing, a certain number of data files or objects. If not, the action is considered typical (block 904). If the speed is too fast, then the action is considered suspicious (block 903).

In an example embodiment of implementing block 902, the module determines if the user attempted to access, or accessed, x number or more of data files or objects within y seconds (block 905). If so, the speed is too fast. It can be appreciated that the parameters x and y in block 905 are parameters that can be adjusted.

In an example embodiment, accessing a data file or data object includes opening or viewing the contents of the data file or object, as well as downloading the data file of data object. Attempting to access a data file or object includes viewing or scanning the existence of the data file or object, without viewing the primary contents of the data file or object.

Figure 10:
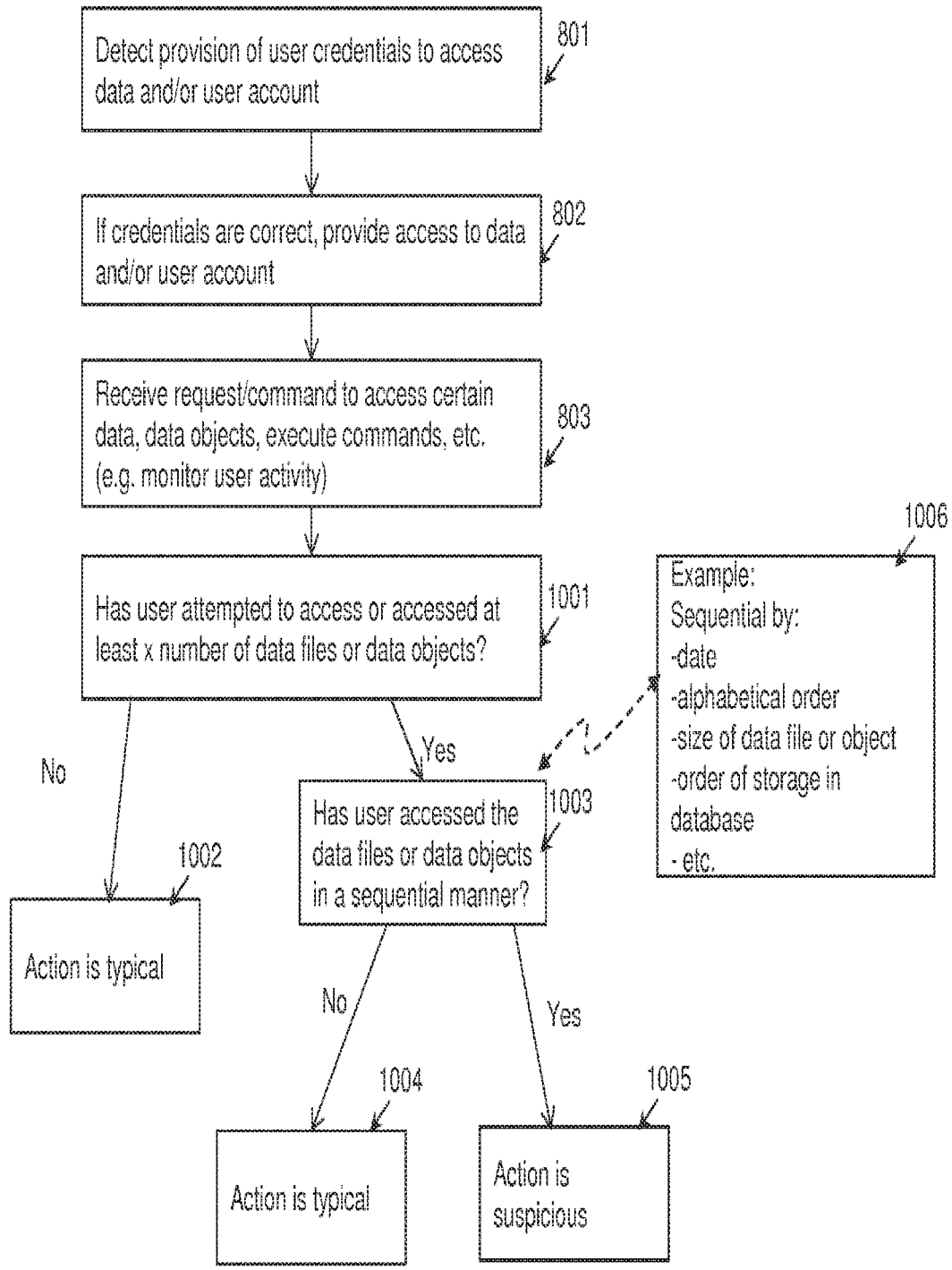
FIG. 10 is a flow diagram of an example embodiment of computer executable or processor implemented instructions for detecting suspicious actions based on the number of data files or object accessed or viewed, as well as the sequence in which they are accessed or viewed.

Turning to FIG. 10, similar example computer or processor implemented instructions are provided for detecting suspicious activity, as per FIG. 8. Blocks 801, 802, 803 are implemented. Following, at block 1001, the module determines if the user has attempted to access or has accessed at least x number of data files or objects. If not, the action is considered typical (block 1002). If so, the module determines if the user has accessed the data files or data objects in a sequential manner (block 1003).

As per block 1006, the sequential manner can be identified by various ways. For example, data files or objects are accessed or are attempted to be accessed in sequence by: date, alphabetical order, size of the data file or object, order of storage in a database, etc.

If the user has accessed the data files in a sequential order, the action is considered suspicious (block 1005). Otherwise, the action is considered typical (block 1004).

Figure 11:
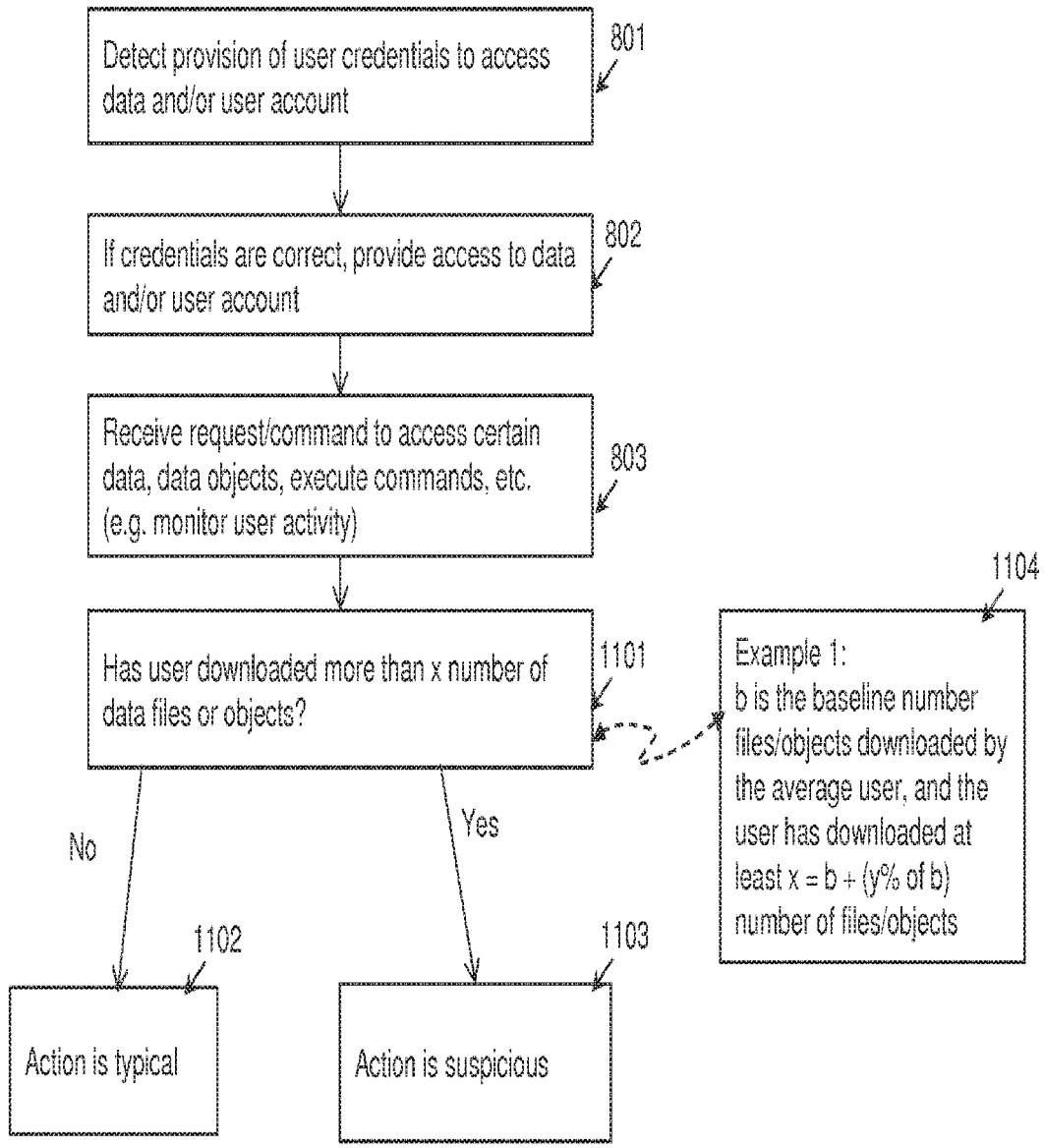
FIG. 11 is a flow diagram of an example embodiment of computer executable or processor implemented instructions for detecting suspicious actions based on the number of data files or object downloaded, or attempted to be downloaded.

Turning to FIG. 11, similar example computer or processor implemented instructions are provided for detecting suspicious activity, as per FIG. 8. Blocks 801, 802, 803 are implemented. Following, at block 1101, the module determines if the user has downloaded more than x number of data files or objects. For example, as per block 1104, b is the baseline number files/objects downloaded by the average user, and x is computed by x=b+(y % of b) number of files/objects. In this example, x, b and y are parameters that can be adjusted.

If the user has downloaded more than x number of data files or objects, then the action is suspicious (block 1103). Otherwise, the action is considered typical (block 1102).

Figure 12:
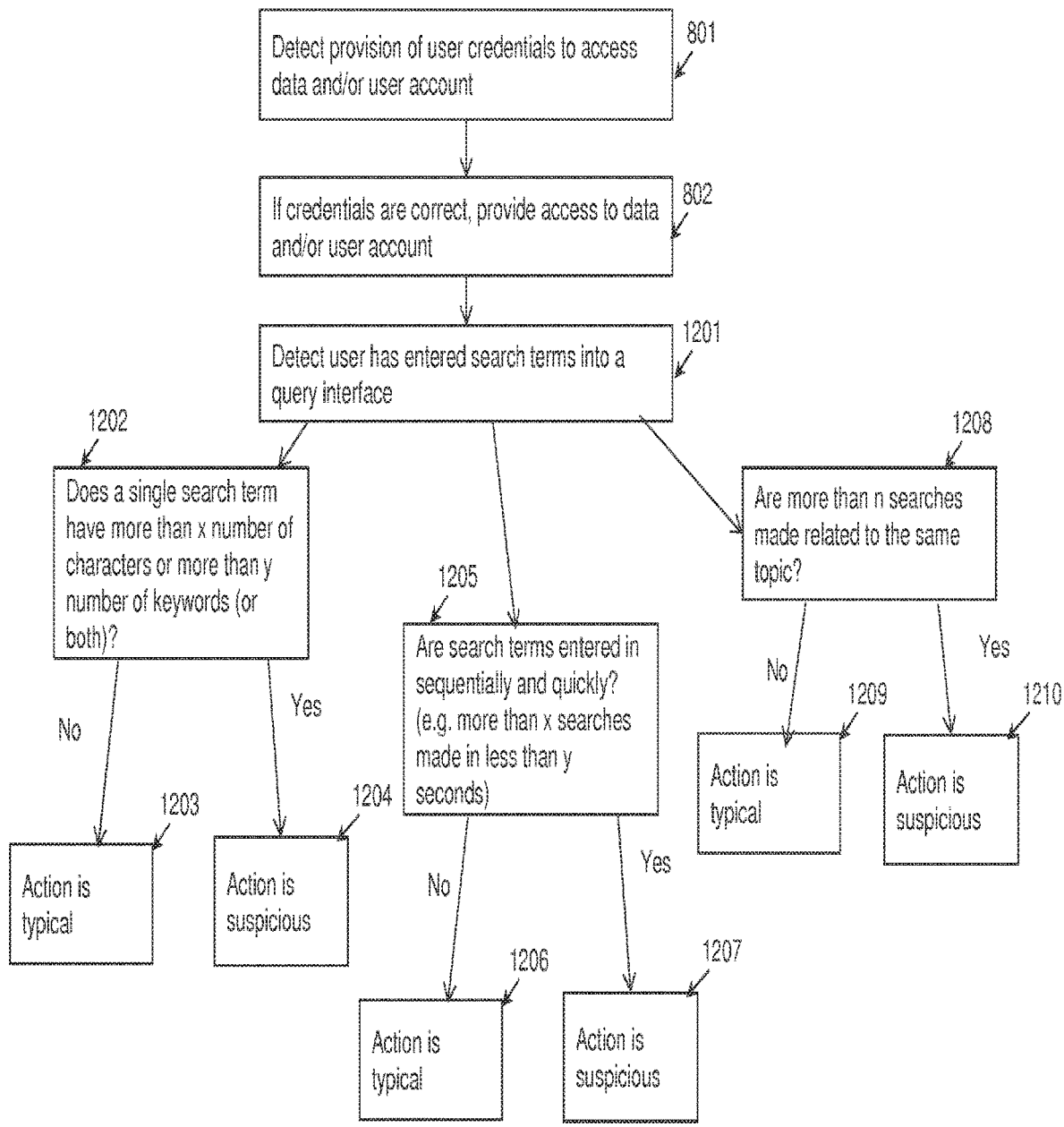
FIG. 12 is a flow diagram of an example embodiment of computer executable or processor implemented instructions for detecting suspicious actions based on how a query is conducted using search terms.

Turning to FIG. 12, similar example computer or processor implemented instructions are provided for detecting suspicious activity, as per FIG. 8. Blocks 801 and 802 are implemented. Following, at block 1201, the module detects the user has entered search terms into a query interface. From this one or more determinations are made (blocks 1202, 1205, and 1208). If multiple determinations are made, they can be made in parallel or in series.

At block 1202, the module determines if a single search term has more than x number of characters or more than y number of keywords (or both). If any of such conditions are true, then the action is considered suspicious (block 1204). Otherwise the action is considered typical (block 1203).

At block 1205, the module determines if the search terms are entered in sequentially and quickly. For example, the module examines if more than x number of searches are made in less than y seconds. If so, the action is considered suspicious (block 1207), and otherwise is considered typical (block 1206).

At block 1208, the module determines if there are more than n searches made in relation to same topic. If so, the action is considered suspicious (block 1210) and, if not, the action is considered typical (block 1209).

Figure 13:
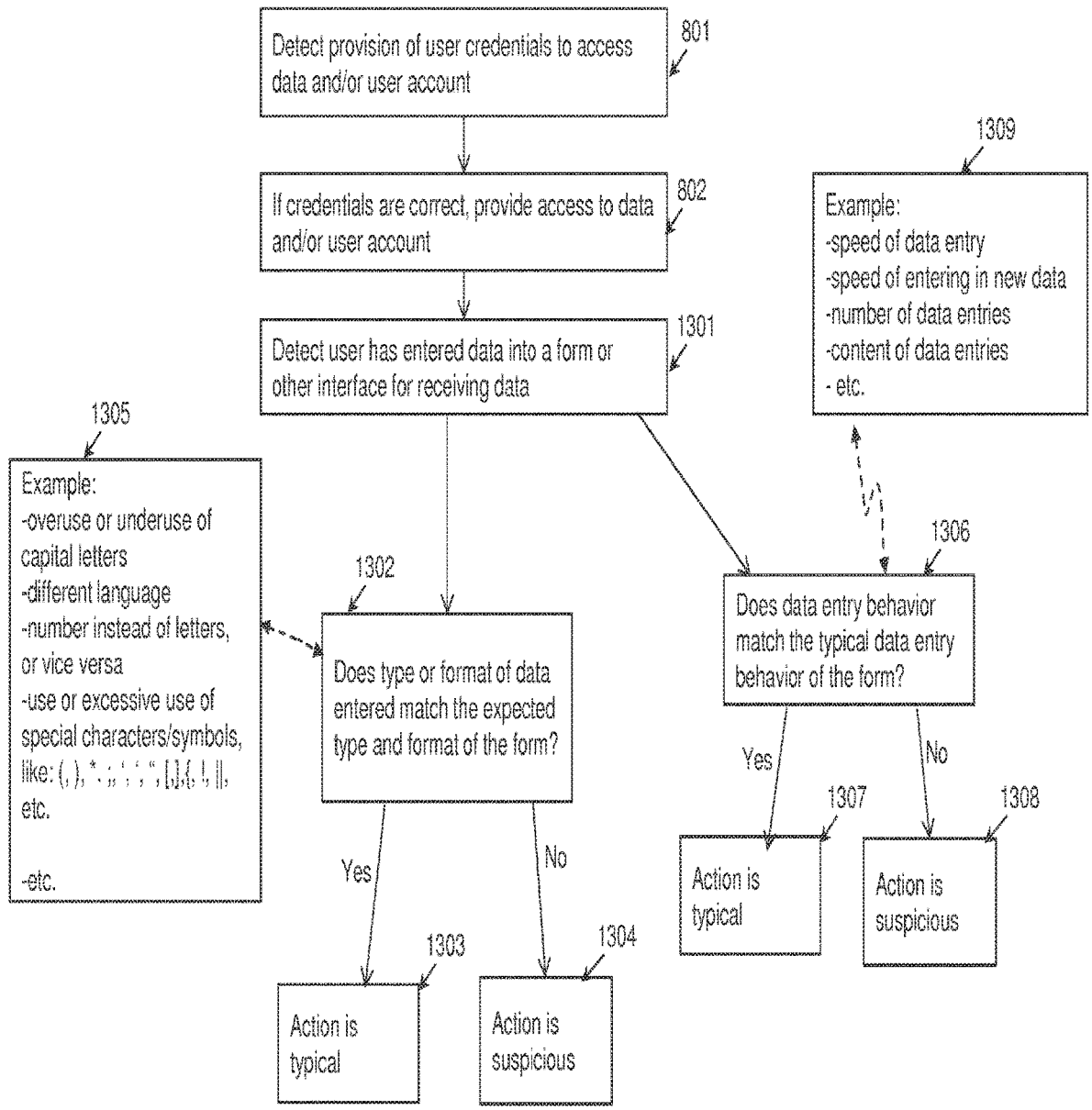
FIG. 13 is a flow diagram of an example embodiment of computer executable or processor implemented instructions for detecting suspicious actions based on how and what data is entered into a form or other interface.

Turning to FIG. 13, similar example computer or processor implemented instructions are provided for detecting suspicious activity, as per FIG. 8. Blocks 801 and 802 are implemented. Following, at block 1301, the module detects if the user has entered data into a form or other interface for receiving data. One or more determinations (block 1302 and 1306) are made. If multiple determinations are made, they can be made either in parallel or in series.

At block 1302, the module determines if the type or format of data entered matches the expected type and format of the form. For example, to make such a determination, the module examines the entered data to detects one or more of the following characteristics (block 1305): overuse or underuse of capital letters; different language; number used instead of letters, or vice versa; and use or excessive use of special characters/symbols, like (,), *., ·, ', ', ", [,], {, !, ||. If the type or format of the data does not match, the action is considered suspicious (block 1304) and, otherwise, the action is considered typical (block 1303).

At block 1306, the module determines if the data entry behavior matches the typical data entry behavior of the form.

For example, the module examines the speed of data entry, the speed of entering in new data, the number of data entries, and the content of data entries (block 1309). A computer executable software, which is malicious, or an adversary, would, for example, copy and paste data entries very quickly, which indicates that a human user is not typing in data or entering in data. In another example, if the content of the data entries relates to classified or confidential information which is not usual for the user credentials, then the action is considered suspicious. Therefore, if the data entry behaviour is not typical, then the action is suspicious (block 1308). Otherwise, the action is typical (block 1307).

Figure 14:
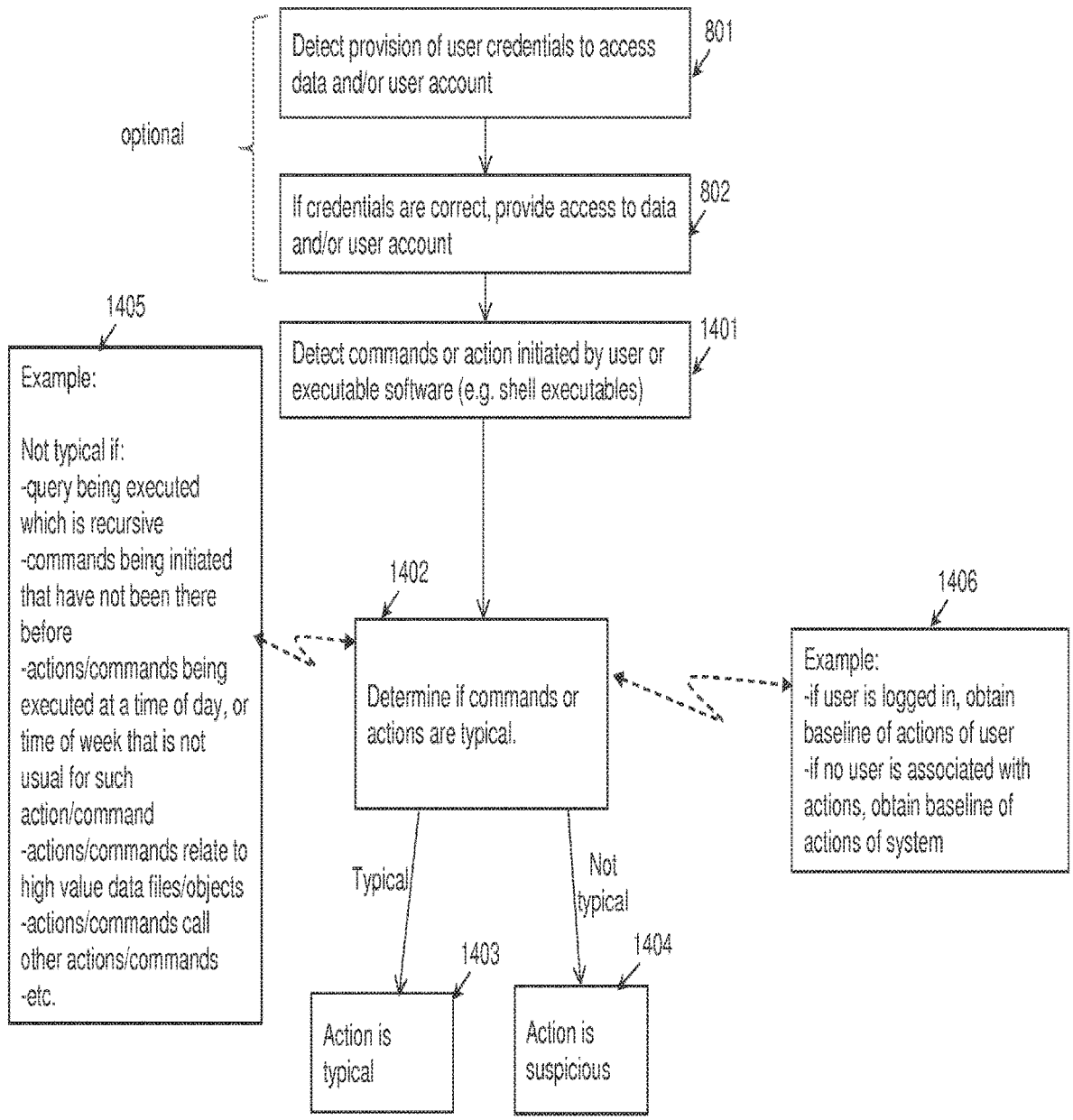
FIG. 14 is a flow diagram of an example embodiment of computer executable or processor implemented instructions for detecting suspicious actions based on evaluating whether commands or actions are typical.

Turning to FIG. 14, similar example computer or processor implemented instructions are provided for detecting suspicious activity, as per FIG. 8. Blocks 801 and 802 may or may not be implemented. In other words, a user may not even log in and, it is recognized, that malicious software may be embedded in the server network to automatically carry actions. At block 1401, the module detects commands or actions initiated by the user or executable software (e.g. shell executables). At block 1402, the module determines if the commands or actions are typical. For example, if a user has logged in, the module obtains a baseline of actions of the particular user. If a user has not logged in, and the actions are not associated with a particular user, then the module obtains a baseline of general actions of the server network system. The baselines are used to make the comparisons of whether the commands or actions are typical. In other words, as per 1406, different baselines are used based on the user, if any, or based on the situation where there is no user associated with the actions.

As per block 1405, there are various conditions that may be used to determine if commands or actions are not typical. Example conditions under which an action or actions are not typical include: a query being executed which is recursive; commands being initiated that have not been used before; actions/commands being executed at a time of day, or time of week that is not usual for such action/command; actions/commands relating to high value data files/objects; and actions/commands that call or initiate other actions/commands. Other examples of conditions used to determine whether actions are suspicious include: the frequency of actions; the sequence of inputted commands and action taken; whether the actions are atypical of a certain user profile; whether the actions are atypical of a certain employee type; and whether the many different users or IP addresses (or both), the collection of which is atypical, are conducting similar or the same actions. For example, it is suspicious if many different users or IP addresses (or both), the collection of which is atypical, attempt to access or download the same file or data object within a certain period of time.

If the commands or actions are not typical, then the action is suspicious (block 1404). Otherwise, the action is considered typical (block 1403).

Figure 15:
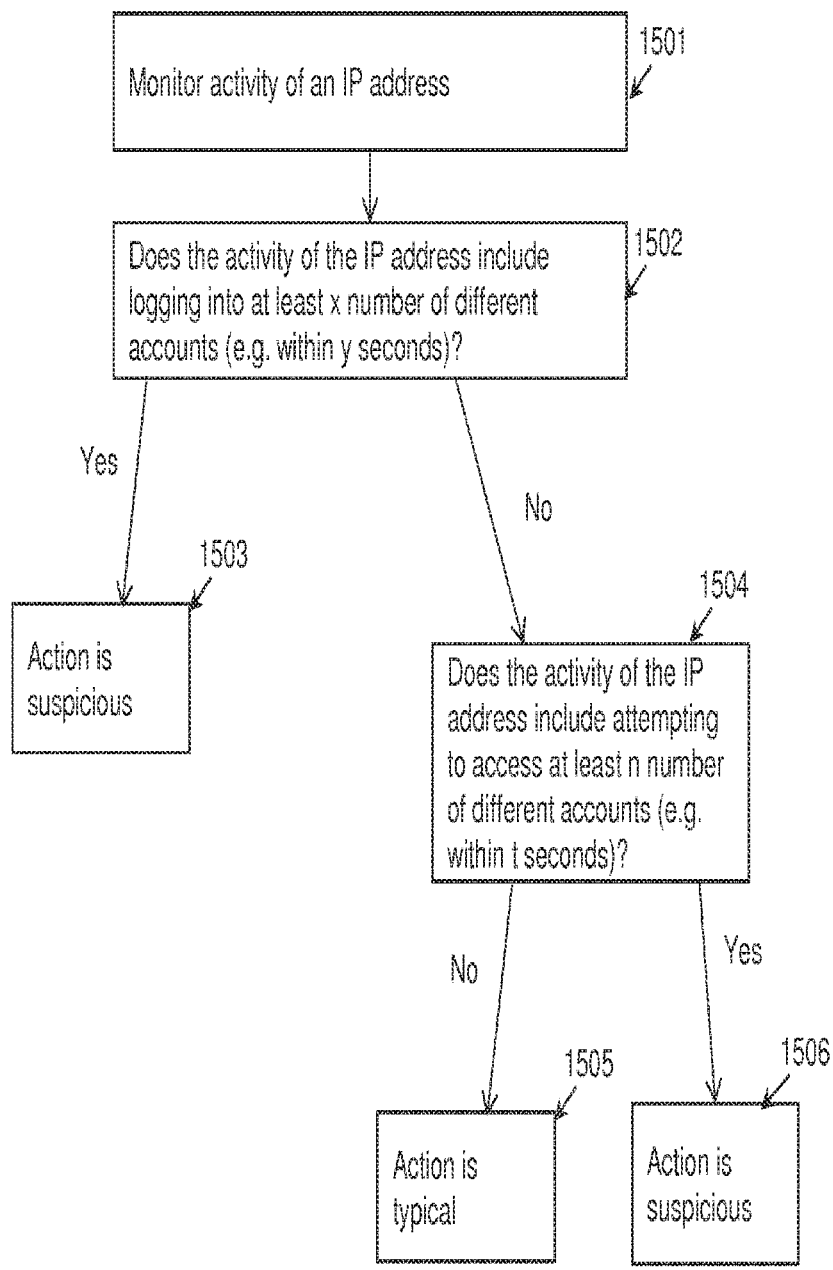
FIG. 15 is a flow diagram of an example embodiment of computer executable or processor implemented instructions for detecting suspicious actions based on evaluating whether the same IP address has been used to log into multiple different user accounts or use multiple employee credentials, or if multiple IP addresses have been used to log into the same user account or use the same employee credentials.

Turning to FIG. 15, example computer or processor implemented instructions are provided for detecting suspicious activity, which may be implemented by the active receiver module 103. At block 1501, the module monitors activity of an IP address. At block 1502, the module determines if the activity of the IP address includes logging into at least x number of different accounts. Such a condition may be modified to evaluate if at least x number of different accounts were accessed within some time period, such as within y seconds. If so, then the action is considered suspicious (block 1503). For example, it is not usual for a single IP address to log into many different accounts within a short time frame.

If, from block 1502, the condition is not true, then the module determines if the activity associated with the IP address includes attempting to access at least n number of different accounts (block 1504). The condition of block 1504 may be modified to determine whether n number of different accounts were attempted to be accessed within a period of time (e.g. the last t seconds). If so, the action is suspicious (block 1506). If not, the action is considered typical (block 1505).

Although not shown in FIG. 15, the instructions further include, for example, determining if at least n number of different IP addresses attempt to access or access the same user account (e.g. use the same login credentials, or use the same employee credentials). In another example, the condition is modified to determine whether the n number of different IP addresses attempt to access, or access, the same user account within a period oft seconds. If such condition is true, then the action is suspicious. Otherwise, it may be considered typical.

Figure 16:
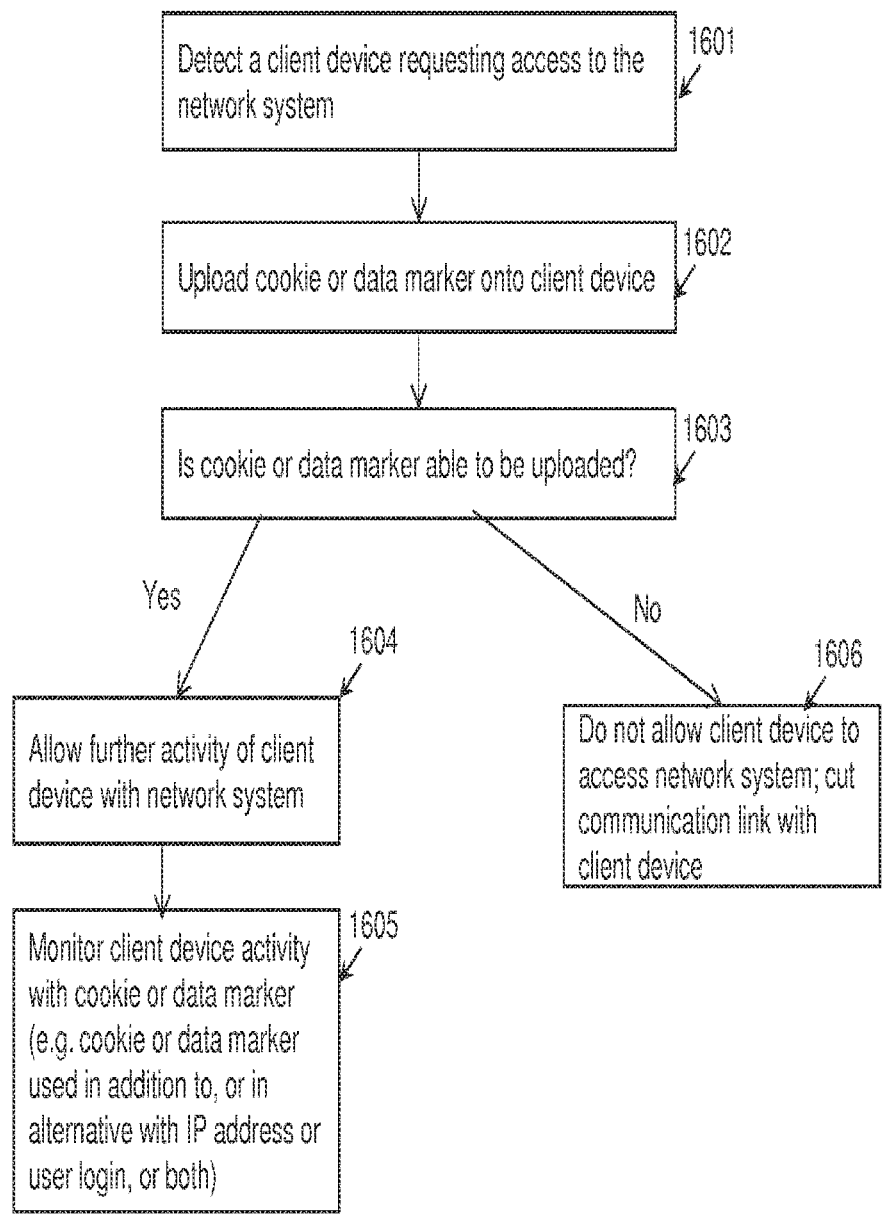
FIG. 16 is a flow diagram of an example embodiment of computer executable or processor implemented instructions for detecting suspicious actions based on evaluating whether a cookie, executable shell, or a data marker has been able to be uploaded to a client device accessing the server network.

Turning to FIG. 16, example computer or processor implemented instructions are provided for detecting suspicious activity, which may be implemented by the active receiver module 103. At block 1601, the module detects a client device requesting access to the server network. At block 1602, the module uploads a cookie, shell executable, or a data marker onto the client device. At block 1603, the module determines if the cookie, shell executable, or the data marker has been able to be uploaded to the client device. If not, it is assumed that the client device is not authorized to access the server network 413. As such, at block 1606, the module does not allow the client device to access the server network and initiates protocols to cut off the communication link the client device. Other actions or security responses may be taken in addition or in the alternative.

If the cookie, shell executable, or the marker is able to be uploaded, at block 1604, the module allows further activity of the client device with the server network. At block 1605, the module monitors the client device activity with the cookie or the data marker (e.g. cookie or data marker used in addition to, or in alternative with IP address or user login, or both).

In another example embodiment, not shown, example computer or processor implemented instructions are provided for detecting suspicious activity, which may be implemented by the active receiver module 103. The instructions include detecting if a cookie, shell executable, SQL injected data, a data marker, or other software program or data element exists on a server or database. If so, a comparison is made between an earlier copy of the data and software on the server or database and the current data and software on the server and database. By way of background, the earlier copy of the data and software on the server or database is obtained, for example, periodically, and stored on another server for future retrieval. If the comparison review that the detected cookie, shell executable, SQL injected data, data marker, etc. in the current data and software does not exist in the earlier copy of the data and software, then the detected cookie, shell executable, SQL injected data, data marker, etc. is considered suspicious and is deleted.

It can be appreciated that there are different ways to detect suspicious activity. The examples of detecting suspicious activity described herein can be used together with each other in different combinations, or individually.

In another example embodiment, the active receiver module 103 is configured to operate with little or no human intervention.

Active Marker Module

The active marker module 104 is configured to actively analyze and apply markers to data files or data objects. These markers, for example, are applied to high valued data files or objects. The markers may also be applied to different classifications of data, or all data within the server network. The markers are metadata that may or may not be explicit so as to not make the marker known to users. For example, a picture may be part of a document that has an embedded beacon or marker. To a user, including an adversary, the document with the picture would not be able to detect the embedded data.

The Active marker module would insert these markers or beacons to hinder data files or objects from leaving the server network, for example, by issuing an immediate session termination. For example, if the marker detected that a particular file was about to be, or in the process of being downloaded, the marker initiates a termination command to the communication link or destroys the file, or both.

In another example embodiment, if the data file or data object is successfully downloaded outside the server network, the beacons or emitters (e.g. markers) would send a signal back to the security system 102 to notify that the data file or object was opened outside the server network and that such activity was no authorized for external viewing.

In another example embodiment, a data file or data object containing the marker is configured to be destroyed by the marker, such as when an adversary downloads the data file of object, or when the marker does not receive a local and recognized handshake IP address.

Figure 25:
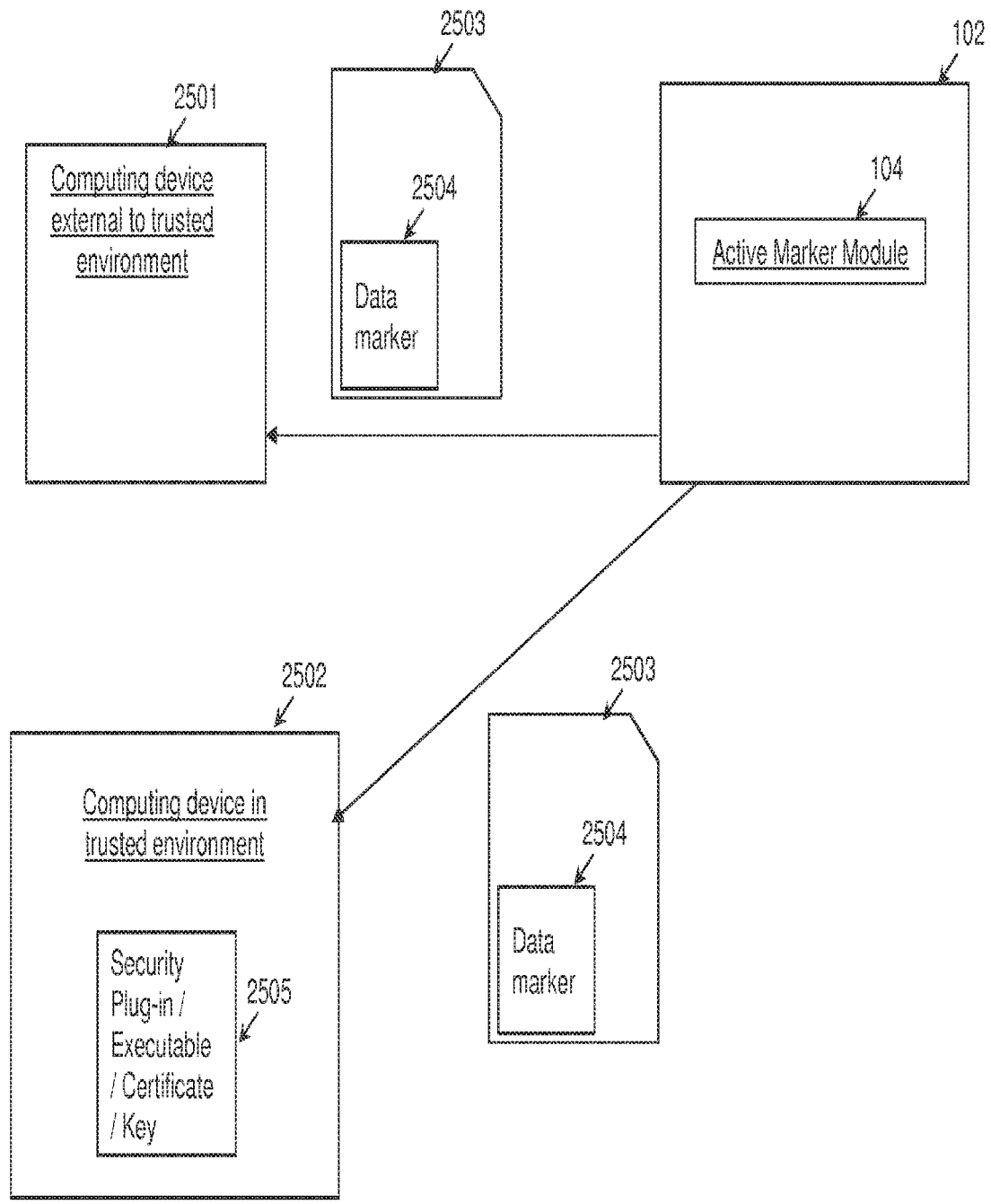
FIG. 25 is an example embodiment of system diagram for the continuous active data security system interacting with a trusted computing device and an untrusted computing device, and sending a data file or object that includes a data marker.

Turning to FIG. 25, an example system diagram shows the security system 102, which includes the active marker module 104. An untrusted computing device 2501 (e.g. adversarial device) and a trusted computing device 2502 are shown in communication with the security system 102. The trusted computing device 2502 includes data or software, or both, 2505 that identifies the computing device as being trusted. The data or software 2505 may include any one or more of a plug-in, an executable, a certificate, a credential, a security key, a security hash, a machine authentication code (MAC), etc. The data or software 2505, in an example embodiment, is sent by the security system 102 only to trusted devices and is updated by the security system 102 on a periodic basis. In this way, even if an adversarial computer copied the data or software 2505, the copy would be out of date. In FIG. 25, the untrusted computing device 2501 does not have the data or software 2505. Data files or objects 2503 include a data marker 2504 that is able to receive, exchange or transmit data with the data or software 2505. When a data marker 2504 detects that it is not able to authenticate or verify data with the data or software 2505 on a device, the data marker 2504 is configured to destroy or delete the data file or object 2503.

Continuing with FIG. 25, in an example embodiment of executable instructions, at least two factors of authentication are required for a device 2501. When the trusted computing device 2502 attempts to download the data file or object 2503, the trusted computing device 2502 must first pass the verification protocols given by the security system (e.g. correct password, unsuspicious IP address, unsuspicious actions, etc.). After passing the verification protocols, the data file or object 2503 is downloaded or viewable by the computing device 2502. The data marker 2504 detects if it can obtain, exchange or send the required data with the device 2502, which is based on the data marker's interaction with the data or software 2505. If so, the data file or object 2503 is able to be viewed or downloaded, or both.

In another scenario, regarding the untrusted computing device 2501, the untrusted computing device may use illegitimate means (e.g. hacking, deception, stolen passwords, etc.) to pass in the initial verification protocols given by the security system 102. In other words, the untrusted computing device is therefore able to pass the first factor of authentication and is able to download the data file or object 2503. Prior to the untrusted computing device 2501 opening or viewing the data file or object 2503, the data marker 2504 determines if the computing device 2501 has the correct verification data or software 2505. When the data marker 2504 does not detect that the correct verification data or software 2505 is locally available on the computing device 2501, as is the case in FIG. 25, then the data marker 2504 self-destroys the data file or object 2503. In this way, an adversary, even if successful in downloading a data file or object, is not able to view the contents of the data file or object.

Figure 17:
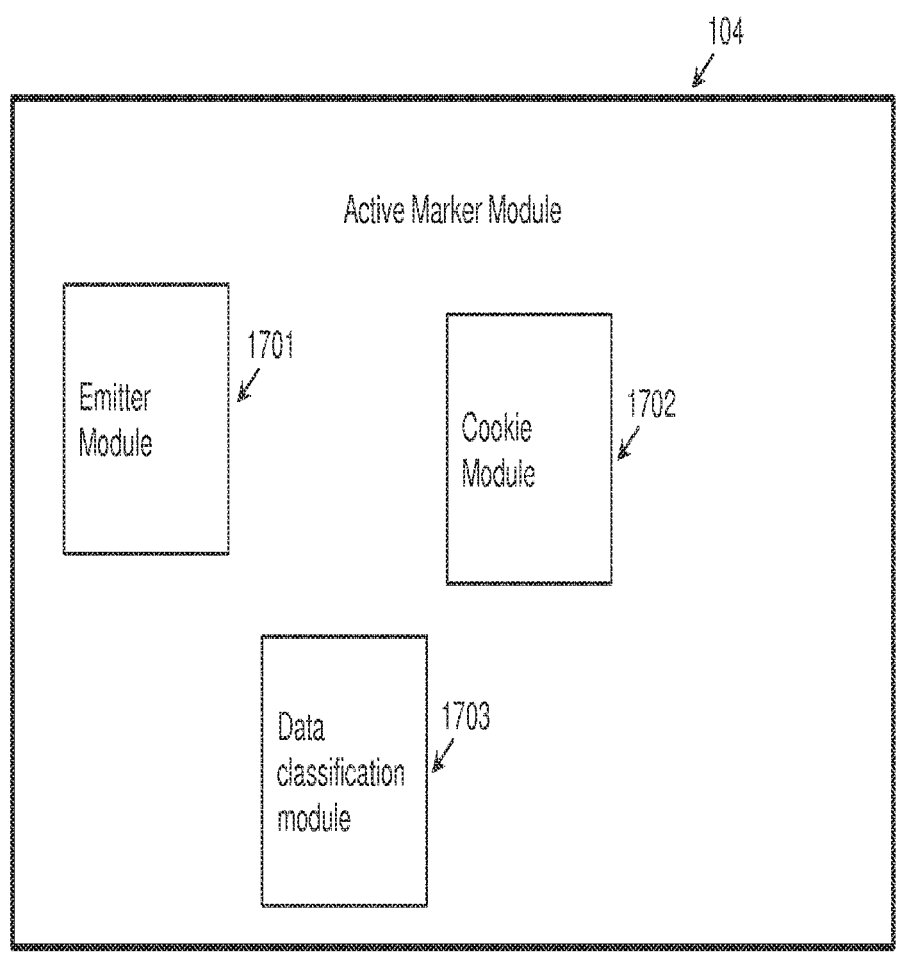
FIG. 17 is a block diagram of an active marker module showing example components thereof.

Turning to FIG. 17, example components of the active marker module 104 are shown. Example components include an emitter module 1701 and a cookie module 1702. The emitter module embeds and tracks emitter-type markers into data files or data objects, where the emitters are configured to actively send data to the security system 102. The cookie module 1702 uploads cookies within a client device interacting with the server network. The cookies can also be a form of marker to track a data file or object.

Continuing with FIG. 17, the data classification module 1703 is used to classify data objects or files within the server network. For example, the classification is done in real-time as new data files or data objects are added to the server network, and the classification may change as one or more parameters related to the data file or data object also changes. For example, a data file or data object is not yet published and thus has a confidential or high-value status. After the data file or data object has published, the classification changes to low value. Other parameters can be used to identify the classification, such as the content of the data file or object, the author of the data file or object, and the format of the data file or data object.

Figure 18:
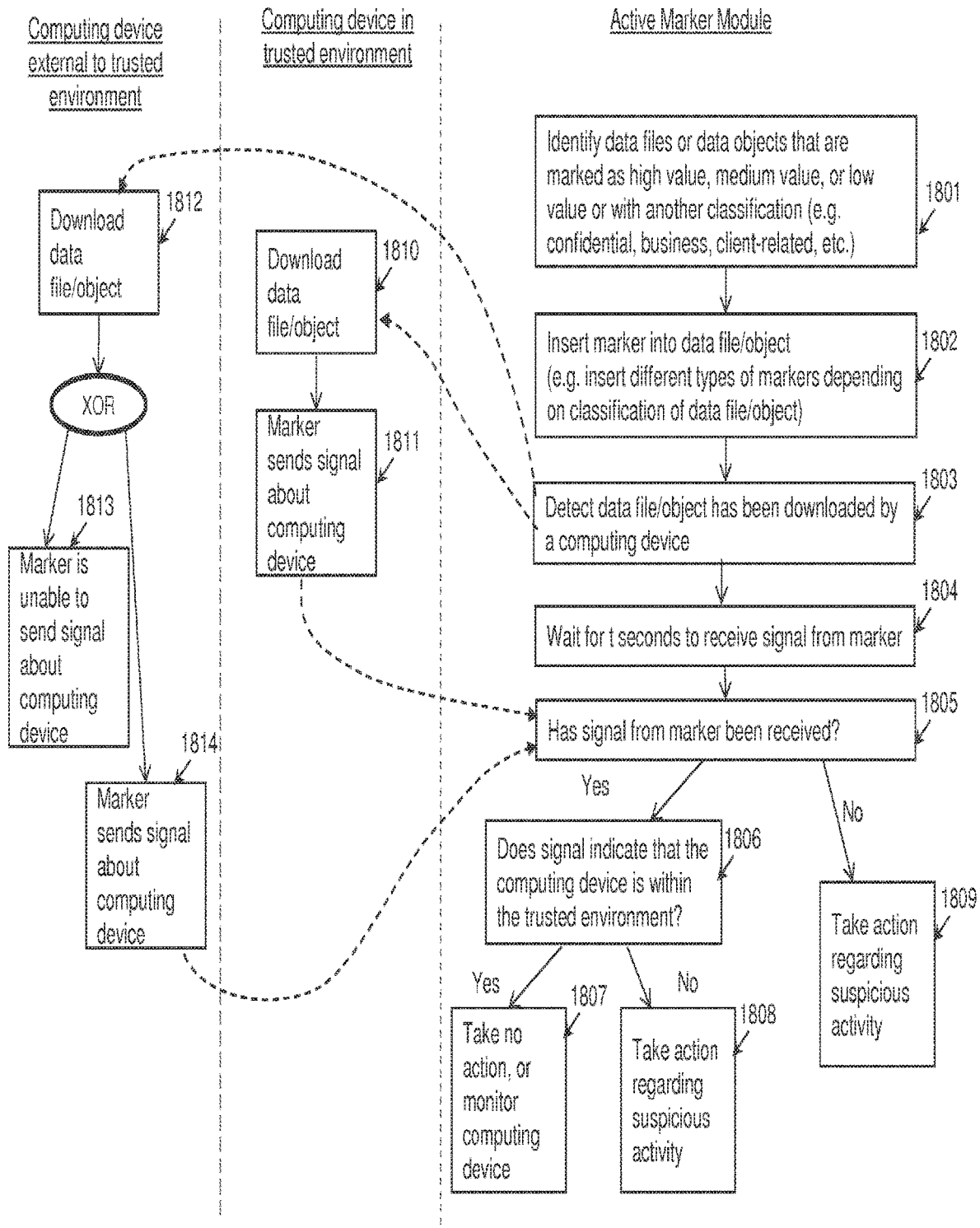
FIG. 18 is a flow diagram of an example embodiment of computer executable or processor implemented instructions for inserting a marker into a data file or object, and using the marker to detect suspicious activity.

Turning to FIG. 18, example computer or processor implemented instructions are provided for embedding and tracking a marker. At block 1801, the active marker module identifies data files or data objects that are marked as high value, medium value, or low value or with another classification (e.g. confidential, business, client-related, etc.). At block 1802, the module inserts a marker into data file/object. For example, the module inserts different types of markers depending on the classification of data file/object. At block 1803, the module detects the data file/object has been downloaded by a computing device. At block 1804, the module waits for t seconds to receive the signal from the marker. The parameter t can be adjusted.

At block 1805, the module determines if the signal from the marker has been received. If not, the module considers the action to be suspicious and takes action regarding the suspicious activity (block 1809). If the module has received a signal, at block 1806, the module determines if the signal indicates that the computing device is within the trusted environment (e.g. is authorized to access the server network or is part of the server network). If so, the module takes no action or monitors the computing device (block 1807). If not, the module takes action regarding suspicious activity (block 1808).

From the perspective a computing device in the trusted environment, the computing device downloads the data file or object from the server network (block 1810). The marker within or attached to the data file or object sends a signal about the computing device to the active marker module (block 1811). This signal is received at block 1805.

From the perspective of a computing device that is external to the trusted environment, the computing device downloads a data file or object (block 1812). In one situation, the marker is unable to send a signal about the computing device to the active marker module (block 1813). This may be due to the computing device being external to the trusted environment, or the signal may be purposely blocked because of actions caused by the adversary. In another example embodiment, the marker does send a signal about the computing device (block 1814), which is received by the active marker module at block 1805.

Figure 19:
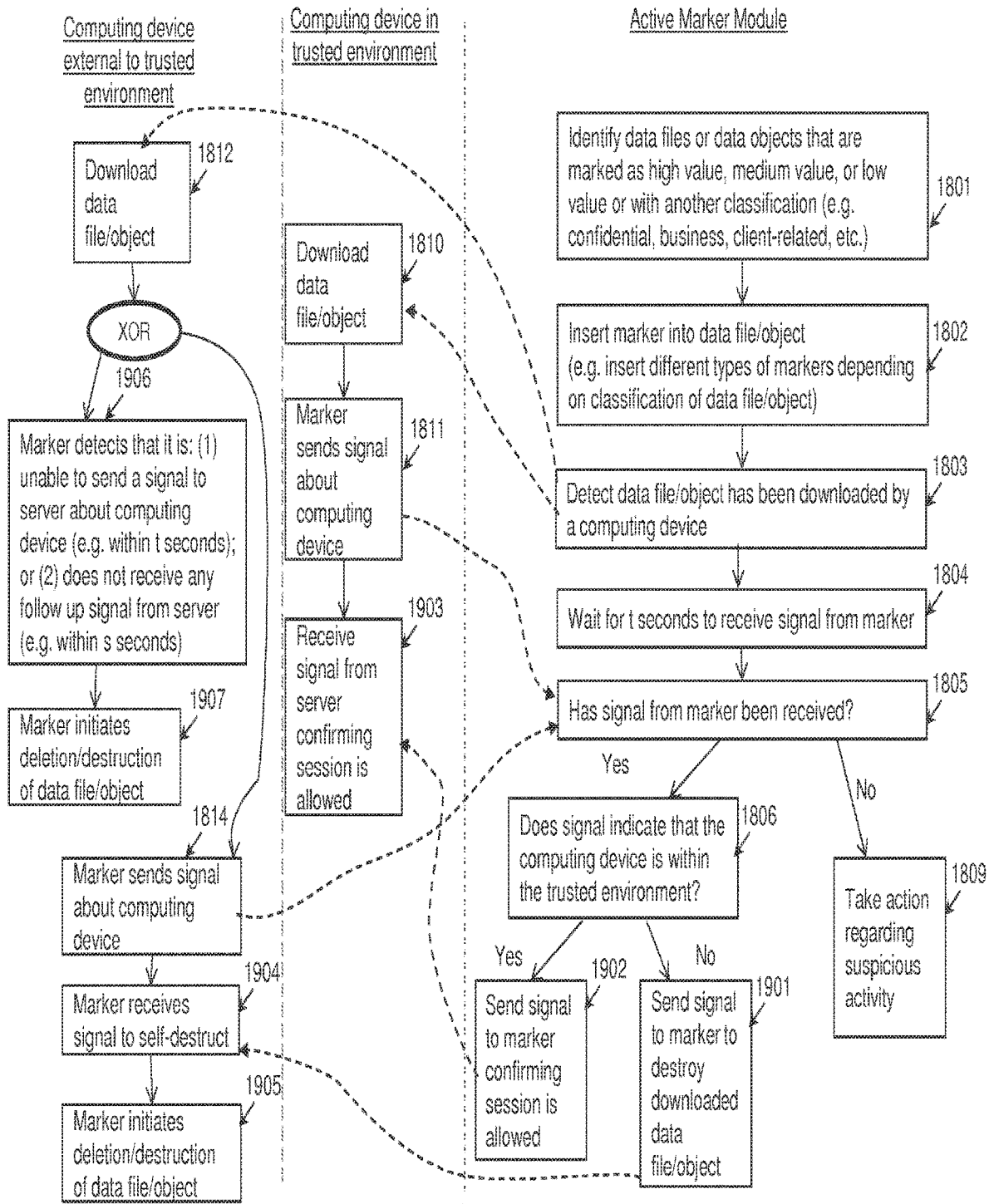
FIG. 19 is a flow diagram of another example embodiment of computer executable or processor implemented instructions for inserting a marker into a data file or object, and using the marker to detect suspicious activity.

Turning to FIG. 19, example computer or processor implemented instructions are provided, and these instructions are a variation of those provided in FIG. 18. Many of the operations are the same (e.g. blocks 1801, 1802, 1803, 1804, 1805, 1806, 1809, 1810, 1811, 1812) and, thus, are not repeated here. Following block 1806, if the signal indicates that the computing device is within the trusted environment, then the module sends a signal to the marker confirming the session is allowed (block 1902). If, following block 1806, the signal indicates that the computing device is not within the trusted environment, the module sends a signal to the marker to destroy the downloaded data file or object (block 1901).

From the perspective of the computing device within the trusted environment, following block 1811, the computing device and, more particularly, the marker receives a signal from the active marker module confirming the session is allowed (block 1903). This signal was initiated in block 1902.

From the perspective of the computing device that is external to the trusted environment, following block 1812, different situations can occur.

In one situation, as per block 1906, the marker detects that it is: (1) unable to send a signal to server about computing device (e.g. within t seconds); or (2) does not receive any follow up signal from server (e.g. within s seconds). Therefore, at block 1907, the marker initiates the deletion or destruction of the data file or object. In other words, even if an adversary tries to block further communication between their own computing device and the security system, the downloaded file or object is still destroyed.

In another situation, as per block 1814, the marker sends signal about computing device, which indicates the computing device is external to the trusted environment. As per block 1904, the marker receives a signal to self-destruct. The signal was initiated by the module at block 1901. After receiving such a signal, the marker initiates the deletion or destruction of the data file or object (block 1905).

In another example embodiment, the marker is able to monitor other activities of the adversary's computing devices. In another example embodiment, the marker is able to plant malicious software in the adversary's computing device.

In another example embodiment, the active marker module 104 is configured to operate with little or no human intervention.

Active Transmitter Module

The active transmitter module 105 executes actions or responses, for example in real-time, based on the data and analysis of the active receiver module and the active marker module.

Figure 20:
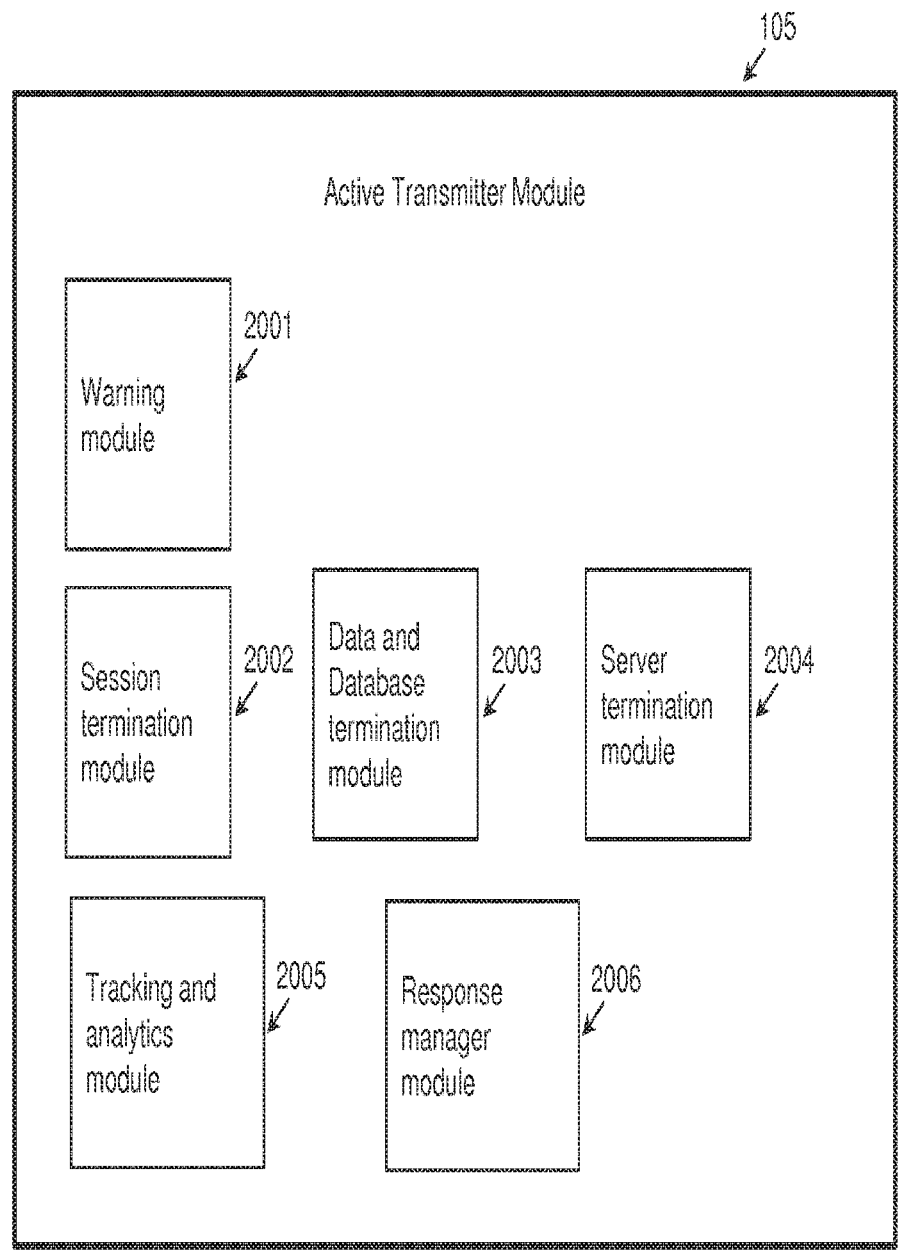
FIG. 20 is a block diagram of an active transmitter module showing example components thereof

Turning to FIG. 20, example components of the active transmitter module 105 are shown. Example components include a warning module 2001, a session termination module 2002, a data and database termination module 2003, a sever termination module 2004, a tracking and analytics module 2005, and a response manager module 2006. Module 2001 is configured to send warnings and alerts. Module 2002 is configured to terminate communication sessions of certain IP addresses and users. Module 2003 is configured to terminate data or databases, or both. Module 2004 is configured to cut off or terminate communication of a server from the server network 413, so that no other computing device, whether or not an adversary, can access the server. Module 2004 is also configured to power off server devices. Module 2005 tracks and analyzes the effectiveness of the responses. Module 2006 manages the order and selection of the responses, for example, based on the level of suspiciousness or the level of security risk.

Figure 21:
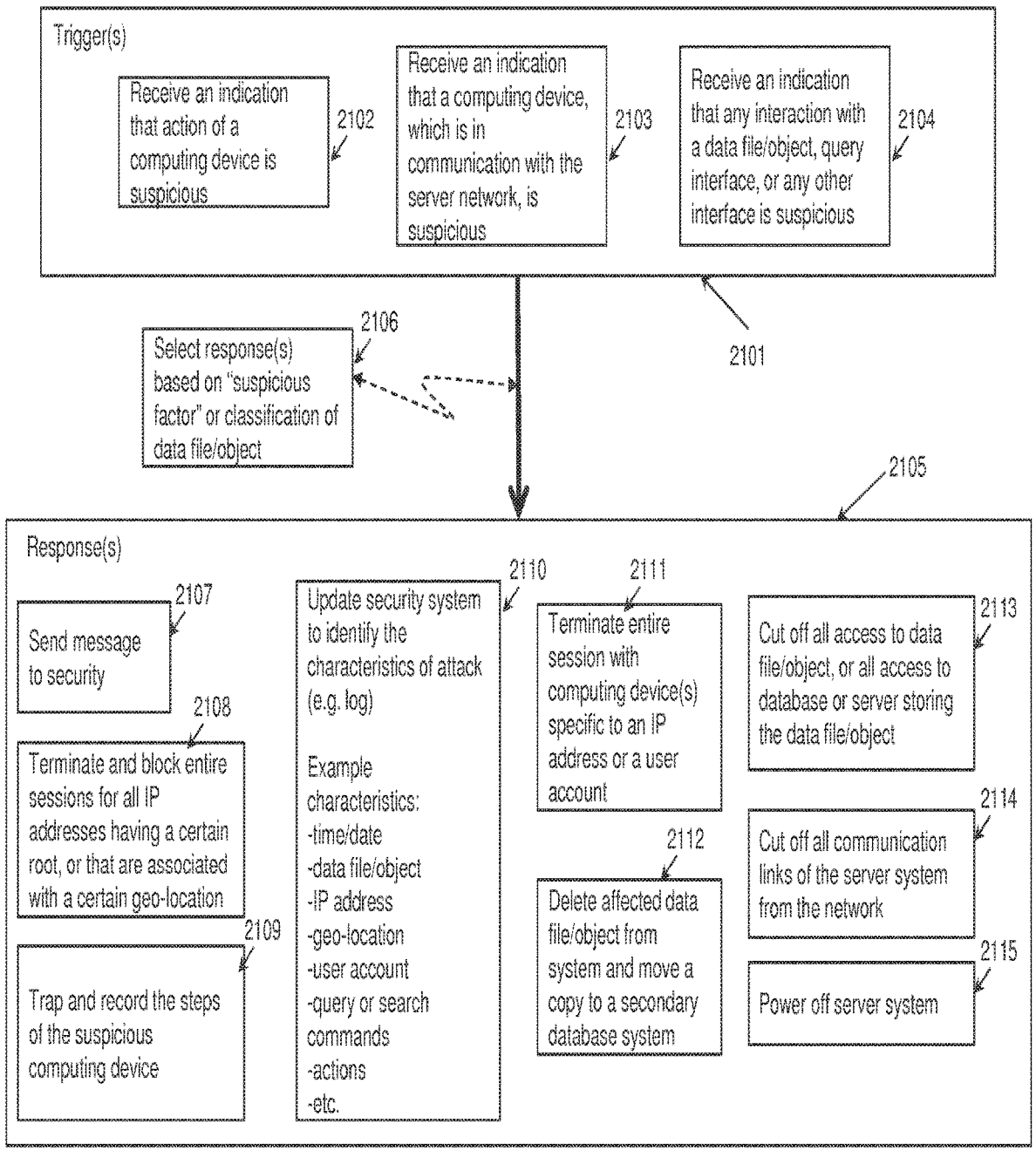
FIG. 21 is a flow diagram of an example embodiment of computer executable or processor implemented instructions for transmitting one or more responses based on detecting suspicious activity or characteristics.

Turning to FIG. 21, example computer or processor implemented instructions are provided for responding to suspicious activity or characteristics. In block 2101, the active transmitter module detects one more triggers regarding suspicious activity. At block 2105, the module initiates a response, or multiple responses. The response, for example, is executed in real-time upon detecting a trigger.

For example, the active transmitter module receives one or more triggers from the other modules 103, 104. Examples of specific triggers for the suspicious activity or characteristics were described above. More generally, a trigger includes the module 105 receiving an indication that one or more actions of a computing device are suspicious (block 2102). Another trigger example is receiving an indication that a computing device, which is in communication with the server network, is suspicious (block 2103). For example, the computing device is suspicious because of a characteristic (e.g. IP address, user account, geo-location, etc.), not necessarily due to an action of the computing device. Another example of a trigger is the module 105 receiving an indication that any interaction with a data file/object, query interface, or any other interface is suspicious, regardless of whether or not a computing device has been identified or associated with the suspicious activity (block 2104).

The selection of one or more responses is, for example, based on a "suspicious factor" or is based on the classification of the data file or object that is at risk. For example, a suspicious factor may be an index used to grade the level of suspicion. A higher suspicious factor would invoke a more extreme response, while a lower suspicious factor would invoke a less extreme response. The suspicious factor may be a score that is computed by the security system 102. In a non-limiting example embodiment, the score is computed using a FICO score or something similar. A FICO score is used to identify fraud and credit risk using neural network applications.

Examples of responses include sending a message to a security system or to security personnel (block 2107). Another response is terminating and blocking entire sessions for all IP addresses having a certain root, or that are associated with a certain geo-location (block 2108). Another response is to trap and record the steps of the suspicious computing device (block 2109). For example, to trap the suspicious computing device, the security system 102 captures and records future activity of the suspicious computing device, without the knowledge of the suspicious computing device. The monitored activity includes commands, inputted data (e.g. SQL parameters), timing of actions, IP addresses, etc. This collected data is used to profile suspicious activity and catch future suspicious computing devices that have similar actions as those actions that have already been recorded.

Another response is to update the security system 102 (e.g. the active profiler module 106 and the active receiver module 103) to identify characteristics of the attack and to log or record such characteristics (block 2110). Examples of characteristics include: time/date; data file/object; IP address; geo-location; user account; query or search commands; and actions.

Another example response includes terminating an entire session with one or more computing devices specific to an IP address or a user account (block 2111). Another response is to delete an affected data file/object, or an at-risk data file/object, from the server network and move a copy to a secondary database system (block 2112). The secondary database system may be part of the server network, or may be separate from the server network.

Another example response includes cutting off all access to a specific data file/object, or all access to a database or a server storing the specific data file/object (block 2113). Another response includes cutting off all communication links of the server network, so that no computing device can access the server network (block 2114). In an example embodiment, even servers and devices that form the server network would not be able to communicate with each other.

Another example response is to power off one or more certain servers or devices in the server network, or to power off all servers or devices in the server network (block 2115).

It is appreciated that there may be other responses that can be used by the active transmitter module 105. One or more of these responses can be used. When multiple responses are used, different combinations can be employed. The responses may be used in parallel, or in series and in various orders.

Figure 22:
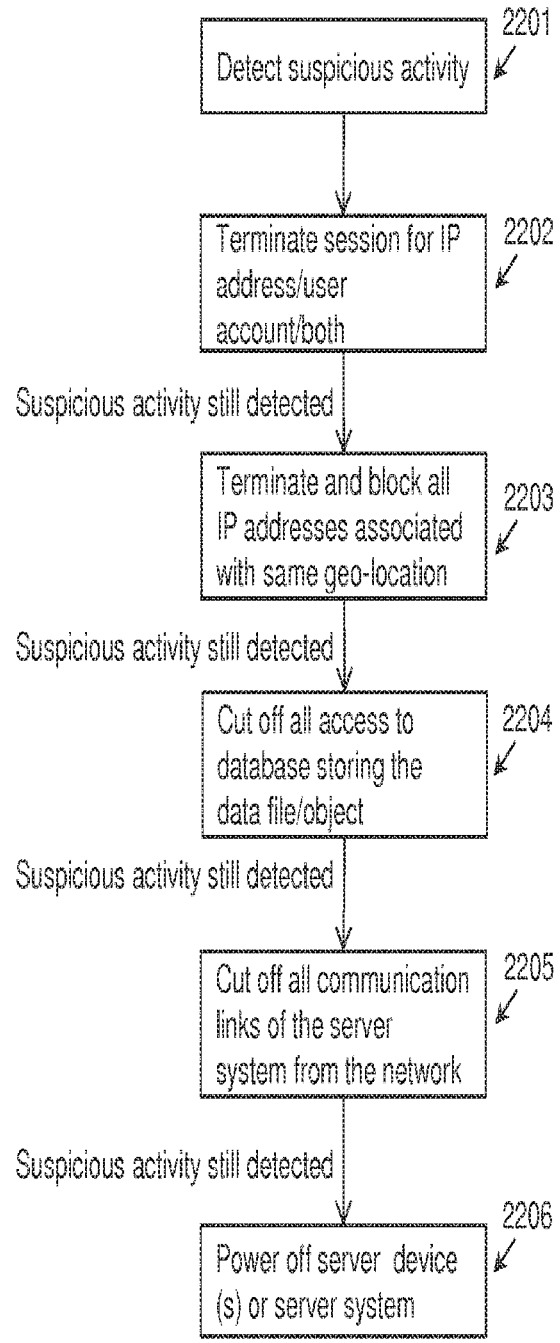
FIG. 22 is a flow diagram of an example embodiment of computer executable or processor implemented instructions for executing one or more responses in a sequential manner.

Turning to FIG. 22, example computer or processor implemented instructions are provided for executing responses in a certain order. At block 2201, the module 105 detects suspicious activity. At block 2202, the module terminates a session for an IP address or a user account, or both. If suspicious activity is still detected, the module terminates and blocks all IP addresses associated with same geo-location (block 2203). If suspicious activity is still detected, the module cuts off all access to one or more databases that store the affected or at-risk data files or objects (block 2204). If suspicious activity is still detected, the module cuts off all communication links of the server network (block 2205). If suspicious activity is still detected, the module powers off one or more, or all, server devices of the server network (block 2206).

Other orders or sequences for responding can be used.

Active Profiler Module

The active profiler module 106 is configured to perform machine learning, analytics, and to make decisions according to security goals and objectives, and business driven rules. The results and recommendations determined by the active profiler module 106 are intelligently integrated with any one or more of the active receiver module 103, the active marker module 104, and the active transmitter module 105, or any other module that can be integrated with the system 102. This module 106 may be placed or located in a number of geo locations, facilitating real time communication amongst the other modules. This arrangement or other arrangements can be used for providing low latency listening and data transmission on a big data scale.

The active profiler module 106 is also configured to identify patterns, correlations, and insights. In an example embodiment, the module 106 is able to identify patterns or insights by analysing all the data from at least two other modules (e.g. any two or more of modules 103, 104 and 105), and these patterns or insights would not have otherwise been determined by individually analysing the data from each of the modules 104, 104 and 105. The feedback or an adjustment command is provided by the active profiler module 106, in an example embodiment, in real time to the other modules. Over time and over a number of iterations, each of the modules 103, 104, 105 and 106 become more effective and efficient at continuous social communication and at their own respective operations.

In an example embodiment, the module 106 identifies data that is classified to be of high value. The modules 103, 104 and 105 refer to the module 106 to determine whether unusual actions are being performed on data that is classified as high value. If suspicious activity is detected against high value data, the active profiler module 106 sends or invokes instructions, which are stored specifically against teach data item or profile.

In another example embodiment, the module 106 stores information about adversaries. Adversaries typically have certain characteristics or act in certain patterns. These types of information are accrued or obtained by the active profiler module, and are stored to assist the security system 102 in identifying future attacks. For example, the active receiver module 103 is configured to quickly access the active profiler module 106 to compare patterns when analysing unidentified patterns and actions against historical patterns. If a risk is detected, the active receiver module 103 notifies the active transmitter module 105 to take action and respond.

Figure 23:
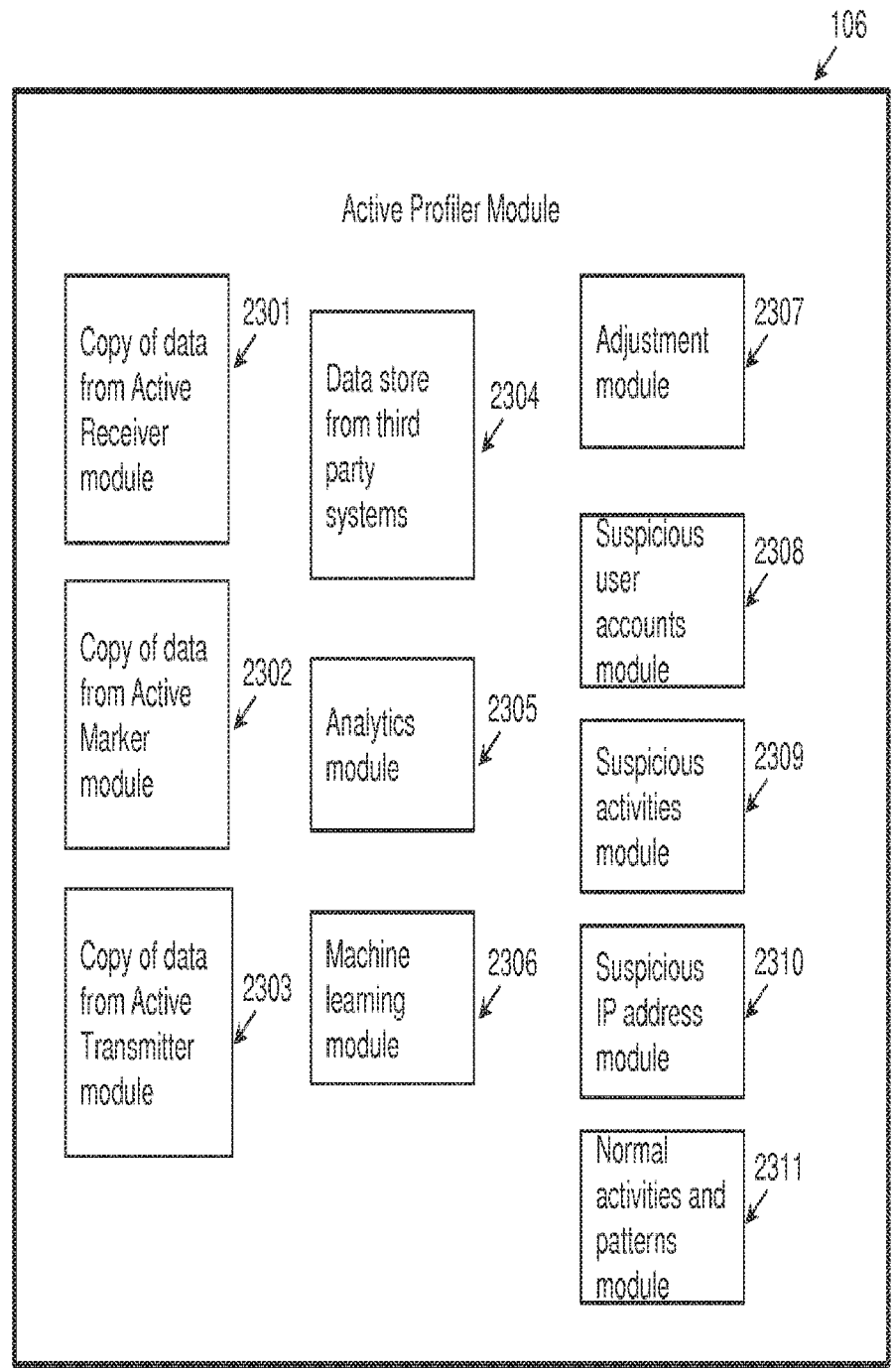
FIG. 23 is a block diagram of an active profiler module showing example components thereof.

Turning to FIG. 23, example components of the active profiler module 106 are shown. Example components include a copy of data from the active receiver module 2301, a copy of data from the active marker module 2302, and a copy of data from the active transmitter module 2303. These copies of data include the inputted data obtained by each module, the intermediary data, the outputted data of each module, the algorithms and computations used by each module, the parameters used by each module, etc. Preferably, although not necessarily, these data stores 2301, 2302 and 2303 are updated frequently. In an example embodiment, the data from the other modules 103, 104, 105 are obtained by the active profiler module 106 in real time as new data from these other modules become available.

Continuing with FIG. 23, example components also include a data store from a third party system 2304, an analytics module 2305, a machine learning module 2306 and an adjustment module 2307. The analytics module 2305 and the machine learning module 2306 process the data 2301, 2302, 2303, 2304 using currently known and future known computing algorithms to make decisions and improve processes amongst all modules (103, 104, 105, and 106). The adjustment module 2307 generates adjustment commands based on the results from the analytics module and the machine learning module. The adjustment commands are then sent to the respective modules (e.g. any one or more of modules 103, 104, 105, and 106).

In an example embodiment, data from a third party system 2304 can be from another security system or security provider. In other words, patterns, trends, and characteristics about attackers and attacks can be shared for the benefit of the security system 102.

Other modules include a suspicious user account module 2308 to establish one or more profiles about user accounts; a suspicious activities module 2309 to establish one or more profiles about certain actions; a suspicious IP address module 2310 to establish profiles about IP addresses; and a normal activities and patterns module 2311 to establish profiles about actions that are considered normal and typical.

In an example embodiment, the suspicious activities are correlated with any one or more of meta data, keywords, search patterns, commands, and functions. In an example embodiment, the normal activities and patterns are correlated with any one or more of data type, content or subject matter of the data (e.g. topic, author, company, date, etc.), IP addresses, geo-location, and user accounts.

Other example aspects of the active profiler module 106 are below.

The active profiler module 106 is configured to integrate data in real time from one or more sub systems and modules, included but not limited to the active receiver module 103, the active marker module 104, and the active transmitter module 105. External or third party systems can be integrated with the module 106.

The active profiler module 106 is configured to apply machine learning and analytics to the obtained data to search for "holistic" data patterns, correlations and insights.

The active profiler module 106 is configured to feed back, in real time, patterns, correlations and insights that were determined by the analytics and machine learning processes. The feedback is directed to the modules 103, 104, 105, and 106 and this integrated feedback loop improves the intelligence of each module and the overall system 102 over time.

The active profiler module 106 is configured to scale the number of such modules. In other words, although the figures show one module 106, there may be multiple instances of such a module 106 to improve the effectiveness and response time of the feedback.

The active profiler module 106 is configured to operate with little or no human intervention.

Figure 24:
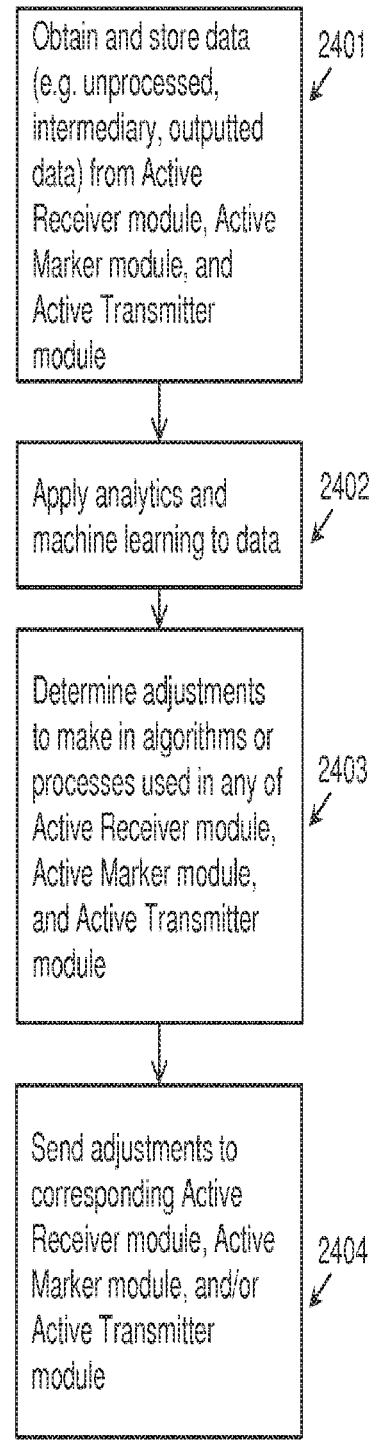
FIG. 24 is a flow diagram of an example embodiment of computer executable or processor implemented instructions for determining adjustments to be made for any of the processes implemented by the active receiver module, the active marker module, and the active transmitter module.

Turning to FIG. 24, example computer or processor implemented instructions are provided for analysing data and providing adjustment commands based on the analysis, according to module 106. At block 2401, the active profiler module obtains and stores data from the active receiver module, the active marker module and the active transmitter module. Analytics and machine learning are applied to the data (block 2402). The module 106 determines adjustments to make in the algorithms or processes used in any of the active receiver module, active marker module, and the active transmitter module (block 2403). The adjustments, or adjustment commands, are then sent to the corresponding module or corresponding modules (block 2404).

It will be appreciated that different features of the example embodiments of the system and methods, as described herein, may be combined with each other in different ways. In other words, different modules, operations and components may be used together according to other example embodiments, although not specifically stated.

The steps or operations in the flow diagrams described herein are just for example. There may be many variations to these steps or operations without departing from the spirit of the invention or inventions. For instance, the steps may be performed in a differing order, or steps may be added, deleted, or modified.

Although the above has been described with reference to certain specific embodiments, various modifications thereof will be apparent to those skilled in the art without departing from the scope of the claims appended hereto.

The invention claimed is:

1. A method performed at a data computing system that includes one or more processor devices, one or more communication devices, and one or more memories, the method comprising:
   monitoring, by the data computing system, one or more requests or activities of a computing device;
   comparing, by the data computing system, the monitored one or more requests or activities with a database of predetermined characteristics to determine whether the monitored one or more requests or activities indicates that the computing device accessed or attempted to access sequentially more than a number of data files or objects in less than a predetermined period of time;
   determining, by the data computing system, that the monitored one or more requests or activities is suspicious when the comparing determines that the monitored one or more requests or activities indicates that the computing device accessed or attempted to access sequentially more than the number of data files or objects in less than a predetermined period of time; and
   initiating, by the data computing system, a response to prevent the monitored one or more requests or activities when the monitored one or more requests or activities is determined to be suspicious.

2. The method of claim 1, further comprising:
   associating a marker to mark monitored one or more requests or activities determined to be suspicious, the marker indicating that a data security action for a marked request or activity should be taken.

3. The method of claim 1, further comprising comparing the monitored one or more requests or activities with the database of predetermined characteristics to determine that the monitored one or more requests or activities is suspicious when an IP address of the computing device matches a known suspicious IP address.

4. The method of claim 1, further comprising comparing the monitored one or more requests or activities with the database of predetermined characteristics to determine that the monitored one or more requests or activities is suspicious when the computing device submits at least a predetermined number of search terms within less than a predetermined period of time.

5. The method of claim 1, further comprising comparing the monitored one or more requests or activities with the database of predetermined characteristics to determine that the monitored one or more requests or activities is suspicious when the computing device submits a search term that included more than at least one of a predetermined number of characters and a predetermined number of keywords.

6. The method of claim 1, further comprising comparing the monitored one or more requests or activities with the database of predetermined characteristics to determine that the monitored one or more requests or activities is suspicious when the computing device makes more than a predetermined number of searches related to a same topic.

7. The method of claim 1, further comprising comparing the monitored one or more requests or activities with the database of predetermined characteristics to determine that the monitored one or more requests or activities is suspicious when the computing device submits data in a format does not match an expected format.

8. The method of claim 1, wherein the response includes terminating a communication channel with the computing device.

9. The method of claim 1, wherein the response includes deleting the monitored one or more requests or activities from a first server, and storing a copy of the monitored one or more requests or activities in a secondary server.

10. A server system, comprising:
one or more processor devices,
one or more communication interfaces connected to the one or more processor devices;
one or more memory devices including computer-executable instructions, which when executed by the one or more processor devices, cause the one or more processor devices to:
monitor one or more requests or activities of a computing device;
perform a comparison of the monitored one or more requests or activities with a database of predetermined characteristics to determine whether the monitored one or more requests or activities indicates that the computing device accessed or attempted to access sequentially more than a number of data files or objects in less than a predetermined period of time;
determine that the monitored one or more requests or activities is suspicious when the comparison determines that the monitored one or more requests or activities indicates that the computing device accessed or attempted to access sequentially more than the number of data files or objects in less than a predetermined period of time; and
initiate a response to prevent the monitored one or more requests or activities when the monitored one or more requests or activities is determined to be suspicious.

11. The server system of claim 10, further comprising computer-executable instructions, which when executed by the one or more processor devices, cause the one or more processor devices to associate a marker to mark monitored one or more requests or activities determined to be suspicious, the marker indicating that a data security action for a marked request or activity should be taken.

12. The server system of claim 10, further comprising computer-executable instructions, which when executed by the one or more processor devices, cause the one or more processor devices to compare the monitored one or more requests or activities with the database of predetermined characteristics to determine that the monitored one or more requests or activities is suspicious when an IP address of the computing device matches a known suspicious IP address.

13. The server system of claim 10, further comprising computer-executable instructions, which when executed by the one or more processor devices, cause the one or more processor devices to compare the monitored one or more requests or activities with the database of predetermined characteristics to determine that the monitored one or more requests or activities is suspicious when the computing device submits at least a predetermined number of search terms within less than a predetermined period of time.

14. The server system of claim 10, further comprising computer-executable instructions, which when executed by the one or more processor devices, cause the one or more processor devices to compare the monitored one or more requests or activities with the database of predetermined characteristics to determine that the monitored one or more requests or activities is suspicious when the computing device submits a search term that included more than at least one of a predetermined number of characters and a predetermined number of keywords.

15. The server system of claim 10, further comprising computer-executable instructions, which when executed by the one or more processor devices, cause the one or more processor devices to compare the monitored one or more requests or activities with the database of predetermined characteristics to determine that the monitored one or more requests or activities is suspicious when the computing device makes more than a predetermined number of searches related to a same topic.

16. The server system of claim 10, further comprising computer-executable instructions, which when executed by the one or more processor devices, cause the one or more processor devices to compare the monitored one or more requests or activities with the database of predetermined characteristics to determine that the monitored one or more requests or activities is suspicious when the computing device submits data in a format does not match an expected format.

17. The server system of claim 10, wherein the response includes terminating a communication channel with the computing device.

18. The server system of claim 10, wherein the response includes deleting the monitored one or more requests or activities from a first server and storing a copy of the monitored one or more requests or activities in a secondary server.

19. A non-transitory, computer-readable medium having instructions stored thereon which, when executed at a data computing system that includes one or more processor devices, one or more communication devices, and one or more memories, cause the data computing system to perform operations that include:
monitoring, by the data computing system, one or more requests or activities of a computing device;
comparing, by the data computing system, the monitored one or more requests or activities with a database of predetermined characteristics to determine whether the monitored one or more requests or activities indicates that the computing device accessed or attempted to access sequentially more than a number of data files or objects in less than a predetermined period of time;
determining, by the data computing system, that the monitored one or more requests or activities is suspicious when the comparing determines that the monitored one or more requests or activities indicates that the computing device accessed or attempted to access sequentially more than the number of data files or objects in less than a predetermined period of time; and
initiating, by the data computing system, a response to prevent the monitored one or more requests or activities when the monitored one or more requests or activities is determined to be suspicious.

* * * * *